(12) United States Patent
Vasilyev et al.

(10) Patent No.: US 11,210,310 B2
(45) Date of Patent: *Dec. 28, 2021

(54) METHOD FOR RENDERING SEARCH RESULTS ON A MAP DISPLAYABLE ON AN ELECTRONIC DEVICE

(71) Applicant: YANDEX EUROPE AG, Lucerne (CH)

(72) Inventors: Evgeny Sergeevich Vasilyev, Saint-Petersburg (RU); Anton Vladimirovich Vronskii, Gelendzhik (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,573

(22) Filed: May 19, 2020

(65) Prior Publication Data

US 2020/0278962 A1   Sep. 3, 2020

Related U.S. Application Data

(63) Continuation of application No. 15/864,296, filed on Jan. 8, 2018, now Pat. No. 10,691,711.

(30) Foreign Application Priority Data

May 4, 2017   (RU) .......................... RU2017115716

(51) Int. Cl.
*G06F 16/24* (2019.01)
*G06F 16/248* (2019.01)
(Continued)

(52) U.S. Cl.
CPC ....... *G06F 16/248* (2019.01); *G01C 21/3673* (2013.01); *G06F 16/24578* (2019.01);
(Continued)

(58) Field of Classification Search
CPC ..................................................... G06F 16/248
(Continued)

(56) References Cited

U.S. PATENT DOCUMENTS 7,826,965 B2   11/2010   Sadri et al.
8,060,510 B2   11/2011   Ghanekar et al.
(Continued)

FOREIGN PATENT DOCUMENTS

CN   103258057 A   8/2013
CN   104239526 A   12/2014
(Continued)

OTHER PUBLICATIONS

English Abstract of KR20150029326 retrieved on Espacenet on Aug. 9, 2017.
(Continued)

*Primary Examiner* — Syling Yen
(74) *Attorney, Agent, or Firm* — BCF LLP

(57) ABSTRACT

There is disclosed a method for rendering search results on a map displayable on an electronic device, the search results being responsive to a geo-search query associated with the map, the electronic device connectable to a map server via a communication network. The method is executable by the electronic device. The method includes maintaining POI label rendering rules, which prescribe rendering rules for processing POI labels associated with POIs that form part of the ranked set of search results. When the electronic device processes additional sets of ranked search results, the method comprises generating a POI label density ratio, which is used to modify the rendering rules used for rendering newly received (i.e. not previously rendered) POI labels. The processing rules can be defined for each zoom
(Continued)

level of the map viewport. The method further includes executing collision verification routine to further modify the POI label rendering rules.

20 Claims, 8 Drawing Sheets

(51) Int. Cl.
  *G01C 21/36* (2006.01)
  *G06T 11/60* (2006.01)
  *G06F 16/29* (2019.01)
  *G06F 16/2457* (2019.01)
(52) U.S. Cl.
  CPC .............. *G06F 16/29* (2019.01); *G06T 11/60* (2013.01); *G06T 2200/24* (2013.01)
(58) Field of Classification Search
  USPC ........................................................ 707/723
  See application file for complete search history.

(56) References Cited

U.S. PATENT DOCUMENTS

| | | | |
|---|---|---|---|
| 8,433,512 | B1 | 4/2013 | Lopatenko et al. |
| 8,560,228 | B2 | 10/2013 | Feldbauer |
| 8,570,326 | B2 | 10/2013 | Gorev |
| 8,731,821 | B2 | 5/2014 | Sheynblat |
| 9,098,929 | B1 | 8/2015 | Wakim |
| 9,116,004 | B2 | 8/2015 | Schaaf et al. |
| 9,285,234 | B1 | 3/2016 | Graf et al. |
| 9,389,095 | B2 | 7/2016 | Li et al. |
| 9,518,836 | B2 | 12/2016 | Beaurepaire |
| 9,552,129 | B2 | 1/2017 | Ramos et al. |
| 2008/0040028 | A1* | 2/2008 | Crump .................... G06F 16/29 701/532 |
| 2012/0046861 | A1* | 2/2012 | Feldbauer ............ G09B 29/106 701/426 |
| 2014/0310299 | A1 | 10/2014 | Nourse et al. |
| 2015/0067598 | A1 | 3/2015 | Yoo et al. |
| 2015/0095150 | A1 | 4/2015 | Globe et al. |
| 2015/0095350 | A1 | 4/2015 | Chen et al. |
| 2015/0192419 | A1 | 7/2015 | Jiang et al. |
| 2015/0261785 | A1 | 9/2015 | Ma et al. |
| 2015/0262428 | A1 | 9/2015 | Tatzgern et al. |
| 2016/0071298 | A1 | 3/2016 | Liu et al. |
| 2016/0275102 | A1 | 9/2016 | Haro et al. |
| 2016/0365072 | A1* | 12/2016 | Blumenberg .......... G01C 21/20 |
| 2017/0061024 | A1* | 3/2017 | Tsuboi ................... H04L 67/18 |

FOREIGN PATENT DOCUMENTS

| | | |
|---|---|---|
| CN | 103208227 B | 8/2015 |
| KR | 20060023786 A | 3/2006 |
| KR | 20150029326 A | 3/2015 |
| RU | 2470367 C2 | 12/2012 |
| RU | 2580335 C1 | 4/2016 |
| WO | 2014045155 A1 | 3/2014 |
| WO | 2015064892 A1 | 5/2015 |
| WO | 2016166309 A1 | 10/2016 |

OTHER PUBLICATIONS

English Abstract of CN103258057 retrieved on Espacenet on Aug. 9, 2017.
English Abstract of CN103208227 retrieved on Espacenet on Aug. 9, 2017.
English Abstract of CN104239526 retrieved on Espacenet on Aug. 9, 2017.
English Description and Claims of KR20060023786 retrieved on Espacenet on Aug. 9, 2017.
Search Report with regard to the counterpart patent application No. RU 2017115716 completed Apr. 10, 2018.
Office Action with regard to the counterpart U.S. Appl. No. 15/864,296 dated Jan. 29, 2020.
Office Action with regard to the counterpart U.S. Appl. No. 15/864,296 dated Oct. 16, 2019.

* cited by examiner

METHOD FOR RENDERING SEARCH RESULTS ON A MAP DISPLAYABLE ON AN ELECTRONIC DEVICE

CROSS-REFERENCE

This application is a continuation of U.S. patent application Ser. No. 15/864,296, filed on Jan. 8, 2018, and entitled "METHOD FOR RENDERING SEARCH RESULTS ON A MAP DISPLAYABLE ON AN ELECTRONIC DEVICE", which claims priority to Russian Patent Applicant No. 2017115716, entitled "Method For Rendering Search Results On A Map Displayable On An Electronic Device," filed May 4, 2017, the entirety of both is incorporated herein by reference.

FIELD OF TECHNOLOGY

The present technology relates to map applications executed in the electronic devices and, more specifically, to methods and systems for rendering search results on a map displayable on an electronic device.

BACKGROUND

With recent developments in the wireless communication, use of wireless communication devices has become almost ubiquitous. These wireless devices include laptop computers, tablet computers, smart phones, as well as plethora of other wireless devices (car navigation devices, user-wearable navigation devices, and the like). Most, if not all, wireless devices are equipped with geo-position devices (for example, those using GPS technology for determining geo position of the wireless device, those using triangulation techniques, or the like).

Most of these wireless devices are further equipped with mapping and/or navigation applications (jointly referred herein below as a map application). A typical map application provides maps of various regions, for example, the user can use the map application to request a map of downtown of London, UK. The user can request such map by various means: by using the geo-location functionality of the wireless device (and a function known as "places near me" or a similar functionality of wireless devices), by typing in a postal code or a full address, etc.

Some of these map applications overlay Points of Interest (POIs) information over the map information displayable on the map. Generally speaking, a POI is any object that can be overlaid over the map information and that the user of the electronic device may find useful. Examples of POIs include: museums, shopping centers, banks, parks, statutes, government buildings, historical buildings, and the like. The map application can display POIs in response to a user geo-query. For example, the user may enter a geo-search query reading: "Display restaurants near me". In response to receiving such geo-query, the electronic device transmits the geo-query to the mapping server and receives therefrom a set of ranked search results—POIs relevant to the geo-query. The map application then generates POI labels and overlays them over the map information based on geo-location information associated with each of the POIs in the ranked set of search results.

US 2016/0365072 discloses an improved navigation application that can generate and display a composite representation of multiple POIs when POI icons representing the POIs appear to be overlapping. Some embodiments display the composite representation when a certain zoom level is reached for a map including the multiple POI icons. In some embodiments, the navigation application can determine POIs that may be of interest to the user based on the user's attributes and activity history and generate the composite representation based on those attributes. The composite representation can include multiple POI icons that are displayed adjacent to each other such that a user of the navigation application can readily identify POIs that are likely to be of interest to the user within a region.

US 2016/0071298 discloses a loading method and apparatus for a map label. The loading method comprises: in response to an instruction to scale up a map, searching for a newly added point of interest in a current visible area of the map after it has been scaled up with respect to the map before it has been scaled up; inheriting a label of an original point of interest of the map before it has been scaled up in the current visible area; and performing collision detection and loading on a label of the newly added point of interest. Compared to the prior art, the present invention can significantly improve the visual experience of a user when loading a map.

US 2015/0095150 discloses methods, apparatuses, and devices for generating maps on a display of, for example, a mobile device, are presented. In one example, a server, such as a map server, may organize a data structure corresponding to a map based, at least in part, on a received query, estimated location, and/or a current route of a mobile device user. Points of interest (POIs) that may be more relevant to a mobile device user may be transmitted from a map server, for example, prior to POIs that may be less relevant. In one example, a plurality of POIs may be rendered on a display of a mobile device. One or more POIs may be emphasized on the display based on one or more criteria.

SUMMARY

Embodiments of the present technology have been developed based on developers' appreciation that there exists at least one problem associated with prior art approaches to processing POI information. Without wishing to be bound to any specific theory, developers of the present technology have appreciated that the ranked search results generated by the mapping server do not take into account the device properties of the electronic device executing the map application (such as screen size, screen resolution, etc.), not does the mapping server account for POI labels already displayed by the electronic device. When the map application of the prior art that is executed on the electronic device receives from the map server the ranked search results, the map application renders POI labels based on POI information received from the map server. When the user of the electronic device requests additional search results (either for the same or a modified viewport of the map), the map application processes the newly received POI information, sometimes modifying, removing and/or overlaying POI labels already displayed on the electronic device. This can result in unnecessary use of processing resources of the electronic device, and additionally in user dissatisfaction with the map application at least partially due to the POI label "switching" between different POI label rendering type.

Broadly speaking, embodiments of the present technology are directed to methods and systems for processing ranked search results that include POI information and for processing POI labels on the electronic device, the POI labels for overlaying over map data (i.e. the graphical representation of streets, buildings, parks, lakes, etc.) by the map application executed on the electronic device. The electronic device is configured to receive one or more sets of ranked search results, including POI information, and to process POI information to generate POI labels based on the POI information and the rendering rules.

The rendering rules specify inter alia (i) a total number of POI labels to be displayed within a given viewport of the map; (ii) a first number of the total number of POI labels indicating of POI labels to be rendered using a first label rendering type, the first label rendering type having a first subset of POI information; and (iii) a remainder of the total number of POI labels renderable using a second label rendering type, the second label rendering type having a second subset of POI information. In accordance with non-limiting embodiments of the present technology, the first sub-set of POI information can be larger than the second subset of POI information. In accordance with other non-limiting embodiments of the present technology, the first sub-set of POI information can be different from the second subset of POI information.

In accordance with embodiments of the present technology, it is contemplated that the POI labels can be rendered using different label rendering types. The label rendering types defined by the non-limiting embodiments of the present technology differ in the type or the amount of POI information that is included in the POI label.

For example, for a given POI (let's assume, for the sake of an illustration, that the given POI is a restaurant), the POI label can be rendered using three label rendering types—a first label rendering type, a second label rendering type and a third label rendering type, as an example only. Each of the first label rendering type, the second label rendering type and the third label rendering type can have a different visual form factor. For example, the third label rendering type can have a visual form factor of a "dot" or a visual icon representing food services. The second label rendering type can include the form factor of the second type of the label and, additionally, include the name of the restaurant. The third label rendering type can include the form factor of the second label rendering type and, additionally, include auxiliary information about the POI (such as, an average price, the type of cuisine served, etc.).

In accordance with the non-limiting embodiments of the present technology, the form factor of the first label rendering type, the second label rendering type and the third label rendering type can be pre-defined to be progressively "visually more significant". In other words, the form factor of the first label rendering type is visually more significant than the form factor of the second label rendering type (and the third label rendering type), thus, indicating to the user of the electronic device, that the POI rendered with the first label rendering type is more significant, for example, in the sense that it is more relevant to the geo-query submitted by the user or generated by the map application on behalf of the user.

Put another way, non-limiting embodiments of the present technology contemplate that more relevant POIs are rendered with a POI label that includes richer information about the POI compared with less relevant POIs. Non-limiting embodiments of the present technology also contemplate, in response to the electronic device receiving additional sets of ranked search results (for the same or for a different viewport), dynamically updating the rendering rule to ensure that "previously rendered" and new POI are displayed without overlapping and avoiding changing previously shown search results.

As has been alluded to above, the rendering rules determine how many POI labels of each of the first label rendering type, the second label rendering type and the third label rendering type are to be rendered. In some embodiments of the present technology, the rendering rules are pre-determined for different zoom levels of the viewport of the map. More specifically, for different zoom levels, the rendering rules determine how many (if any) of the POI labels of the first label rendering type, the second label rendering type and the third label rendering type are to be rendered.

As an example only, the rendering rules can prescribe that:

for zoom levels 0-7 no POI labels are displayed (the map depicts a small-scale view of a large map view, POI labels would make no sense to the user of the electronic device);

for zoom levels 9-10, all POI labels are to be rendered using the third label rendering type only;

for zoom levels 11-13, all POI labels are to be rendered using either the third label rendering type or the second label rendering type (based on their relevancy);

for zoom levels 14-18, POI labels are to be distributed between the first label rendering type, the second label rendering type and the third label rendering type in a pre-determined ration based on their relevancy; for example, five POI labels of the first label rendering type, five POI labels of the second label rendering type and remainder POI labels (to the maximum of twenty in total) of the third label rendering type.

Non-limiting embodiments of the present technology contemplate that once a given POI is rendered using a given one of the first label rendering type, the second label rendering type and the third label rendering type; in response to receiving additional POIs to be displayed or in response to changing the viewport (provided that the given POI is still visible), the rendering of the given POI does not change, even if the electronic device received more relevant POIs.

The only exception to the above is when the user changes the zoom level to the zoom level where no POIs are to be rendered using the POI label of the given one of the first label rendering type, the second label rendering type and the third label rendering type. In this case, the electronic device re-renders the POI label for the given POI (as well as POI labels for all over POIs that have been rendered using the POI label of the given one of first label rendering type, the second label rendering type and the third label rendering type).

Same applies to those situations where the given POI has been rendered using a lower one of the first label rendering type, the second label rendering type and the third label rendering type. Even if in an amended viewport or in the new set of ranked search results, the given POI is associated with higher relevancy, embodiments of the present technology would keep the given POI label rendered using the lower one of the first label rendering type, the second label rendering type and the third label rendering type.

Embodiments of the present technology further contemplate that each POI label can have a label state. As an example, the label state can be one of: regular (the state before the user has interacted with the POI), selected (associated with the POI currently selected by the user) and visited (those POI that have been previously interacted with by the user). In some embodiments, the label states are distinguishable therebetween by color with which they are rendered on the map.

In some embodiments of the present technology, the label states are also maintained when the user changes viewports, zooms or sets of relevant POI labels, provided the associated POI label is still visible.

In some embodiments of the present technology, when POI labels (whether for the initial set of ranked search results or for an additional set of ranked search results), the electronic device checks for collisions (i.e. overlaps) between POI label, if POI labels were to be rendered using the rendering rules.

The POI labels are processed for rendering based on their ranked order within the set of search results (the ranked order is generated by the mapping server that generates the set of search results that are responsive to the geo-query). The collision is checked for each next POI label to be rendered for its collision with an already rendered POI label(s), as well as for the edges of the viewport that the POI label is to be rendered in. In case the electronic device determines a collision for the next POI label to be rendered using its label rendering type prescribed by the rendering rule and the rank of the next POI in the ranked search result set, the electronic device checks if collision can be avoided by rendering the POI label using the next (lower) label rendering type.

The electronic device repeats the collision checking routine until the electronic device determines the suitable label rendering type or determines that the next POI can not be rendered at all. It should be noted that the collision detection routine provides an exception to the rendering rules, as the avoidance of visual overlaps is superior to the order of label rendering types prescribed by the rendering rule.

In accordance with a first broad aspect of the present technology, there is provided a method for rendering search results on a map displayable on an electronic device, the search results being responsive to a geo-search query associated with the map, the electronic device connectable to a map server via a communication network. The method executable by the electronic device. The method comprises: receiving, from the server, a first ranked set of search results, each search result having: an indication of an associated geographical point of interest (POI) that is responsive to the geo-search query, the associated POI having a geo-position within a given viewport of the map displayable on the electronic device; and POI information of the associated POI, at least a portion of the POI information renderable on the electronic device as a POI label of the associated POI; determining a rendering rule associated with rendering POI labels on the electronic device, the rendering rule is for defining: a total number of POI labels to be displayed within the given viewport; a first number of the total number of POI labels indicating of POI labels to be rendered using a first label rendering type, the first label rendering type having a first subset of POI information; a remainder of the total number of POI labels renderable using a second label rendering type, the second label rendering type having a second subset of POI information; for a given POI of first ranked set of search results, determining based on the rendering rule a POI-label rendering instruction, the POI-label rendering instruction for causing the electronic device to render an associated POI label in one of the first label rendering type and the second label rendering type, the determining comprising: in response to the given POI being in the first number of top ranked search results of the first ranked set of search results, determining that the given POI should be rendered with the first label rendering type; in response to the given POI not being in the first number of top ranked search results first ranked set of search results, determining that the given POI should be rendered with the second label rendering type; based on the POI-label rendering instructions, rendering POI labels to be overlaid in the given viewport; receiving a second ranked set of search results for displaying in one of the given viewport and a modified viewport, the second ranked set of search results being at least partially different from the first set of ranked search results; calculating a label rendering type density parameter for the one of the given view port and the modified view port, the label rendering type density parameter being indicative of a number of POI labels of both the first label rendering type and the second label rendering type still displayed within the given viewport and the modified viewport; selecting from the second ranked plurality of search results, POIs that are not part of the number of POI labels of both the first label rendering type and the second label rendering type still displayed within the given viewport and the modified viewport, the selecting resulting in a set of new POIs; based on the label rendering type density parameter, modifying the rendering rule to determine a modified rendering rule, the modified rendering rule for defining a new first number of the total number of new POI labels to be rendered using the first label rendering type; for a given new POI of the set of new POIs, determining a new POI-label rendering instruction by: in response to a given new POI being in the new first number of top second ranked search results, determining that the given new POI should be rendered with the first label rendering type; in response to the given new POI not being in the new first number of top second ranked search results, determining that the given new POI should be rendered with the second label rendering type; based on the new POI-label rendering instructions, rendering new POI labels to be overlaid within the given viewport and the modified viewport.

In some implementations of the method, the POI information includes at least a POI-identifier, a POI-description and auxiliary-POI-data.

In some implementations of the method, the first sub-set of POI information includes at least the POI-identifier and the POI-description; and the second subset of POI information includes only the POI-identifier.

In some implementations of the method, the rendering new POI labels to be overlaid within the given viewport and the modified viewport comprises keeping POI labels of both the first label rendering type and the second label rendering type still displayed within the given viewport and the modified viewport.

In some implementations of the method, the rendering POI labels to be overlaid in the given viewport comprises rendering POI labels in an order of the search results in the first ranked set of search results.

In some implementations of the method, the rendering POI labels in the order of the search results in the first ranked set of search results comprises: for each next POI label, checking for overlap with previously rendered POI labels; and in response to detecting the overlap, modifying rendering instruction for the next POI label.

In some implementations of the method, modifying POI-rendering instruction comprises: in response to the POI-rendering instruction being modified is for rendering the POI label using the first label rendering type, changing the first label rendering type to one of the second label rendering type and a third label rendering type; the third label rendering type being one of: (i) having a third subset of POI information; the third sub-set of POI information being smaller than the second subset of POI information, and (ii)

having a different graphical form-factor having a smaller footprint than a form-factor of the second label rendering type.

In some implementations of the method, the determining the rendering rule for defining comprises retrieving a pre-determined rendering rule.

In some implementations of the method, the first number of the total number of POI labels indicating POI labels to be rendered using the first label rendering type is pre-defined for each zoom level of the viewport.

In some implementations of the method, the second ranked set of search results for displaying in the modified viewport, the method further comprising: determining a zoom level for the modified viewport; and wherein the modifying the rendering rules to determine the modified rendering rule is further based on the zoom level.

In some implementations of the method, in response to the rendering rule for the zoom level not prohibiting POI labels of the first label rendering type, the method further comprises executing: keeping POI labels of both the first label rendering type and the second label rendering type still displayable within the modified viewport; in response to the given new POI having been determined to be rendered with the first label rendering type, rendering the given new POI with the first label rendering type.

In some implementations of the method, in response to the rendering rule for the zoom level prohibiting POI labels of the first label rendering type, the method further comprises executing: changing POI labels of the first label rendering type and the second label rendering type that are still potentially displayable within the modified viewport to the POI label of the second label rendering type; rendering all new POIs with the second label rendering type.

In some implementations of the method, in response to the rendering rule for the zoom level prohibiting POI labels of the first label rendering type and prescribing a third label rendering type, the method further comprises executing: changing POI labels of the first label rendering type and the second label rendering type that are still potentially displayable within the modified viewport to the POI label of the third label rendering type; rendering all new POIs with the third label rendering type.

In some implementations of the method, a form factor of the first label rendering type is selected to be visually more significant than a form factor of the second label rendering type.

In some implementations of the method, the form factor of the first label rendering type is larger than the form factor of the second label rendering type.

In some implementations of the method, the first sub-set of POI includes the POI-identifier, the POI-description and the auxiliary-POI-data.

In some implementations of the method, the first label rendering type is implemented in a form factor that includes: a graphical indication of the associated POI; a first text line including at least a portion of the POI-identifier; a second text line including at least a portion of the auxiliary-POI-data.

In some implementations of the method, the receiving, from the server, the first ranked set of search results is executed in response to receiving the geo-search query.

In some implementations of the method, the receiving the geo-search query comprises one of: receiving the geo-search query from a user of the electronic device and generating the geo-search query in response to the user activating an application for displaying the map.

In some implementations of the method, the first sub-set of POI information is larger than the second subset of POI information.

In some implementations of the method, the first sub-set of POI information is at least partially different from the second subset of POI information.

In some implementations of the method, responsive to a user interaction with a given POI label, the method further comprises changing a visual appearance of the given POI label.

In some implementations of the method, the method further comprises maintaining the changed visual appearance of the given POI label when additional POI labels are rendered.

In accordance with another broad aspect of the present technology, there is provided an electronic device. The electronic device comprises: a processor, a memory accessible by the processor, a network module accessible by the processor, the memory storing computer executable instructions, which instructions when executed cause the processor to execute: receiving, from the server, a first ranked set of search results, each search result having: an indication of an associated geographical point of interest (POI) that is responsive to the geo-search query, the associated POI having a geo-position within a given viewport of the map displayable on the electronic device; and POI information of the associated POI, at least a portion of the POI information renderable on the electronic device as a POI label of the associated POI; determining a rendering rule associated with rendering POI labels on the electronic device, the rendering rule is for defining: a total number of POI labels to be displayed within the given viewport; a first number of the total number of POI labels indicating of POI labels to be rendered using a first label rendering type, the first label rendering type having a first subset of POI information; a remainder of the total number of POI labels renderable using a second label rendering type, the second label rendering type having a second subset of POI information; for a given POI of first ranked set of search results, determining based on the rendering rule a POI-label rendering instruction, the POI-label rendering instruction for causing the electronic device to render an associated POI label in one of the first label rendering type and the second label rendering type, the determining comprising: in response to the given POI being in the first number of top ranked search results of the first ranked set of search results, determining that the given POI should be rendered with the first label rendering type; in response to the given POI not being in the first number of top ranked search results first ranked set of search results, determining that the given POI should be rendered with the second label rendering type; based on the POI-label rendering instructions, rendering POI labels to be overlaid in the given viewport; receiving a second ranked set of search results for displaying in one of the given viewport and a modified viewport, the second ranked set of search results being at least partially different from the first set of ranked search results; calculating a label rendering type density parameter for the one of the given view port and the modified view port, the label rendering type density parameter being indicative of a number of POI labels of both the first label rendering type and the second label rendering type still displayed within the given viewport and the modified viewport; selecting from the second ranked plurality of search results, POIs that are not part of the number of POI labels of both the first label rendering type and the second label rendering type still displayed within the given viewport and the modified viewport, the selecting resulting in a set of new POIs; based on the label rendering type density parameter, modifying the rendering rule to determine a modified rendering rule, the modified rendering rule for defining a new first number of the total number of new POI labels to be rendered using the first label rendering type; for a given new POI of the set of new POIs, determining a new POI-label rendering instruction by: in response to a given new POI being in the new first number of top second ranked search results, determining that the given new POI should be rendered with the first label rendering type; in response to the given new POI not being in the new first number of top second ranked search results, determining that the given new POI should be rendered with the second label rendering type; based on the new POI-label rendering instructions, rendering new POI labels to be overlaid within the given viewport and the modified viewport.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smartphones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

At least some embodiments of the present technology may have a technical effect of improving the user interface of the map application (as an example, making the user interface more user friendly and/or easier to use). At least some embodiments of the present technology may provide an enhanced technique for rendering POI labels on the user interface of the map application.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
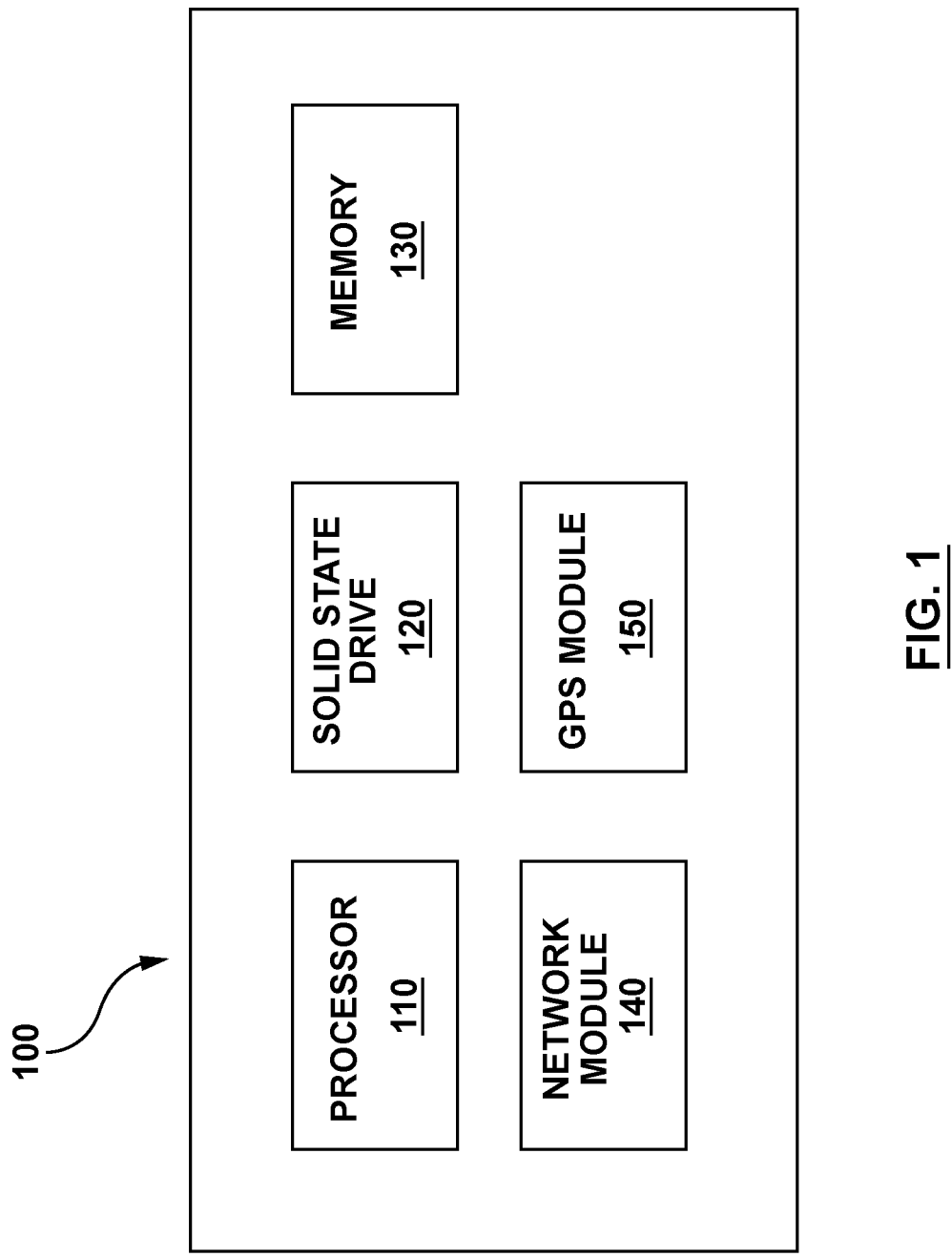
FIG. 1 depicts a schematic diagram of an example electronic device for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, there is shown an electronic device 100 suitable for use with some implementations of the present technology, the electronic device 100 comprising various hardware components including one or more single or multi-core processors collectively represented by a processor 110, a solid-state drive 120, a memory 130, which may be a random-access memory, a network module 140, and a GPS module 150. Communication between the various components of the electronic device 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for displaying information to a user of the electronic device 100 as will be described in further detail below. For example, the program instructions may be part of a mapping or navigational application executable by the processor 110. The network module 140 and the GPS module 150 allow communication between different computer systems, servers and/or other devices.

Figure 2:
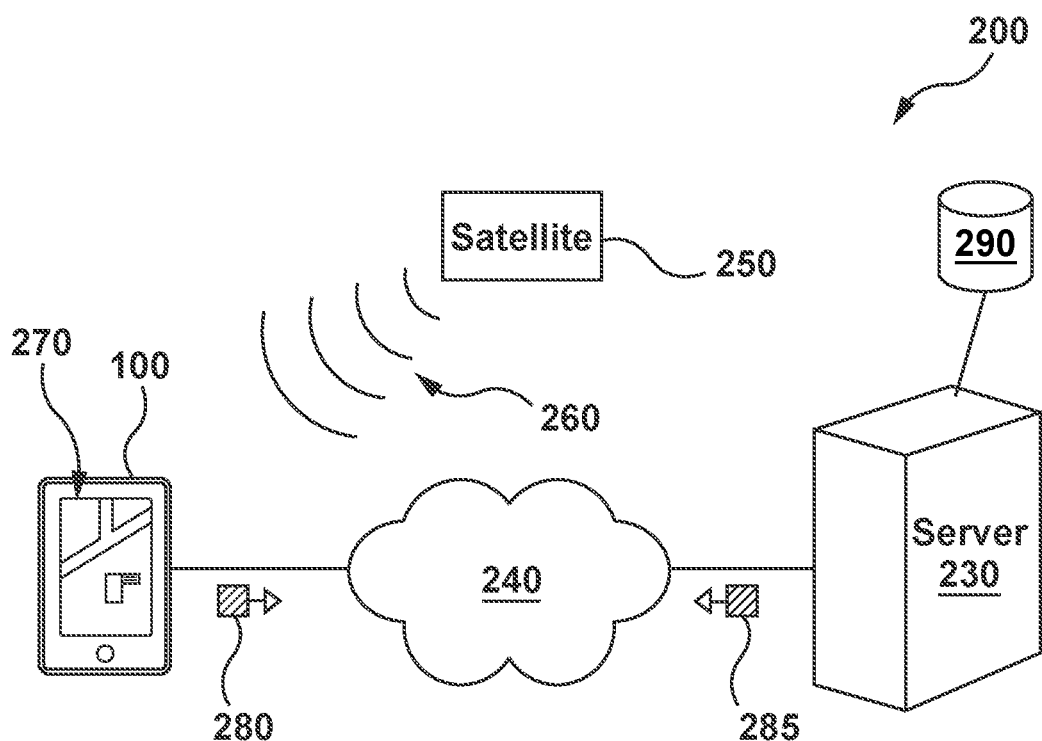
FIG. 2 depicts a networked computing environment suitable for use with some embodiments of the systems and/or methods of the present technology.

FIG. 2 illustrates a networked computing environment 200 suitable for use with some embodiments of the systems and/or methods of the present technology. The networked computing environment 200 comprises the electronic device 100. In the depicted embodiment of FIG. 2, the electronic device 100 is implemented as a tablet computer. However, in alternative embodiments of the present technology, the electronic device 100 can be implemented as a personal computer (desktops, laptops, netbooks, etc.), a smart phone, a tablet, a portable navigation device, a built-in navigation device, etc.

The networked computing environment 200 further comprises a map server 230 in communication with the electronic device 100 via a communications network 240 (e.g. the Internet or the like, as will be described in greater detail herein below), and a GPS satellite 250 transmitting and/or receiving a GPS signal 260 to/from the electronic device 100. It will be understood that the present technology is not limited to GPS and may employ a positioning technology other than GPS.

The network module 140 of the electronic device 100 is configured for communication with the map server 230 via the communications network 240. The GPS module 150 of the electronic device 100 is configured for receiving and transmitting the GPS signal 260 from and to the GPS satellite 250 (i.e., for enabling GPS capabilities of the electronic device 100). The electronic device 100 further comprises hardware and/or software and/or firmware, or a combination thereof, for receiving navigational information, as will be described in greater detail below.

In some embodiments of the present technology, the communications network 240 is the Internet. In alternative non-limiting embodiments, the communication network can be implemented as any suitable local area network (LAN), wide area network (WAN), a private communication network or the like. It should be expressly understood that implementations for the communication network are for illustration purposes only. How a communication link (not separately numbered) between the electronic device 100 and the communications network 240 is implemented will depend inter alia on how the electronic device 100 is implemented.

Merely as an example and not as a limitation, in those embodiments of the present technology where the electronic device 100 is implemented as a wireless communication device such as a smart phone or a navigation device, the communication link can be implemented as a wireless communication link. Examples of wireless communication links include, but are not limited to, a 3G communication network link, a 4G communication network link, a satellite-based communication network link, and the like. The communications network 240 may also use a wireless connection with the map server 230.

In some embodiments of the present technology, the map server 230 is implemented as a conventional computer server. In one non-limiting example, the map server 230 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the map server 230 may be distributed and may be implemented via multiple servers.

In some embodiment of the present technology, the map server 230 comprises hardware and/or software and/or firmware, or a combination thereof, for computing and transmitting at least geographic map data and Point of Interest (POI) information to the electronic device 100. The map server 230 comprises hardware and/or software and/or firmware, or a combination thereof, for executing a machine learning algorithm for executing geo-searches and for providing a ranked set of search results. How the map server 230 trains and executes the machine learning algorithm can be implemented as is known to those of kill in the art.

The electronic device 100 is configured to execute a map application 270. The map application 270 is configured to generate map information to display it on a display of the electronic device 100. More specifically, the map application 270 is configured to (i) communicate with the map server 230 and to receive map information to be displayed on screen of the electronic device 100 (the map information for rendering a particular viewport of a map including rendered indications of roads, streets, buildings, lakes, parks, etc.); (ii) to receive POI information about POIs that are relevant to a geo-search and to overlay POI labels over the map displayed on the screen of the electronic device 100.

More specifically, the map application 270 is configured to receive a map data packet 285 from the map server 230. In some embodiments of the present technology, the map data packet 285 is generated in response to the map server 230 receiving a geo-search request 280 from the map application 270. The geo-search request 280 can be generated is response to the map application 270 receiving the geo-search request 280 from the user of the electronic device 100. For example, the user may have entered using a user interface (such as a touchscreen or a key board) into the map application 270 an indication of the geo-search request 280: "Restaurants near me". Alternatively, the map application 270 may have generated the geo-search request 280 based on an interaction of the user with the map application 270, such as the user initiating execution of the map application 270 or selecting a pre-determined button on the map application 270.

The geo-search request 280 contains indication of the user's geo-search request, as well as an indication of geo-coordinates associated with the electronic device 100. In some embodiments of the present technology, the indication of the geo-coordinates can be received from the user of the electronic device 100. For example, the user may have expressly entered geo-coordinates for the geo-search, such as for example, "Restaurants near Piccadilly Circus in London, UK".

Alternatively, the map application 270 may generate the geo-coordinates using the GPS module 150 of the electronic device 100. For example, in response to the above-mentioned geo-search request 280, the map application 270 may trigger the GPS module 150 to determine the current geo-location from based on data provided by the GPS satellite 250.

In response to receiving the geo-search request 280, the map server 230 generates a set of ranked search results that are responsive to the geo-search request 280. In some embodiments of the present technology, the map server 230 executes a Machine Learning Algorithm (MLA) that is configured to conduct a search and to generate a ranked list of search results. In accordance with non-limiting embodiments of the present technology, the MLA of the map server generates the set of ranked search results that contains a number of POIs, each POI being responsive to the geo-search request 280.

In the above mentioned example of the geo-search request 280: being "Restaurants near me", each POI in the set of ranked search results can be associated with a restaurant or a café s that is located within a pre-determined geographical range from the geo-coordinates, an indication of which was transmitted as part of the geo-search request 280.

The MLA of the map server 230 is configured to execute a ranking formula to determine which POIs are more relevant to the user's geo-search request 280. For example, the geo-search request 280 may be "Cheap restaurants near me", in which case the MLA can rank the POIs based on average bill information associated with each restaurant/café indication of which has been determined to be responsive to the geo-search request 280.

The map server 230 then transmits the map data packet 285 to the electronic device 100. In accordance with non-limiting embodiments of the present technology, the map data packet 285 contains the list of ranked search results. Each result in the set of ranked search result contains: (i) an indication of an associated POI, (ii) geo-coordinates associated with the associated POI for positioning it on the map, (iii) POI information associated with the associated POI.

It is noted that POI information is for enabling the map application 270 to render a POI label associated with the POI and overlay it over map data displayable by the map application 270. In some embodiments of the present technology, the map data for rendering the map (such as streets, intersections, buildings, parks, etc.) is already stored locally at the electronic device 100. In alternative embodiments of the present technology, the map data transmitted from the map server 230 to the electronic device similarly to how the map data packet 285 containing the set of ranked search results is transmitted.

In some embodiments of the present technology, the geo-search request 280 and the map data packet 285 are transmitted using Maps (Mobile Maps) Application Program Interface (API). Alternatively, the geo-search request 280 and the map data packet 285 can be transmitted using the HTTP/HTTPS protocols.

In accordance with non-limiting embodiments of the present technology, the map application 270 is configured to process the set of ranked search results and to render POI labels associated with POIs contained in the set of ranked search results.

Figure 3:
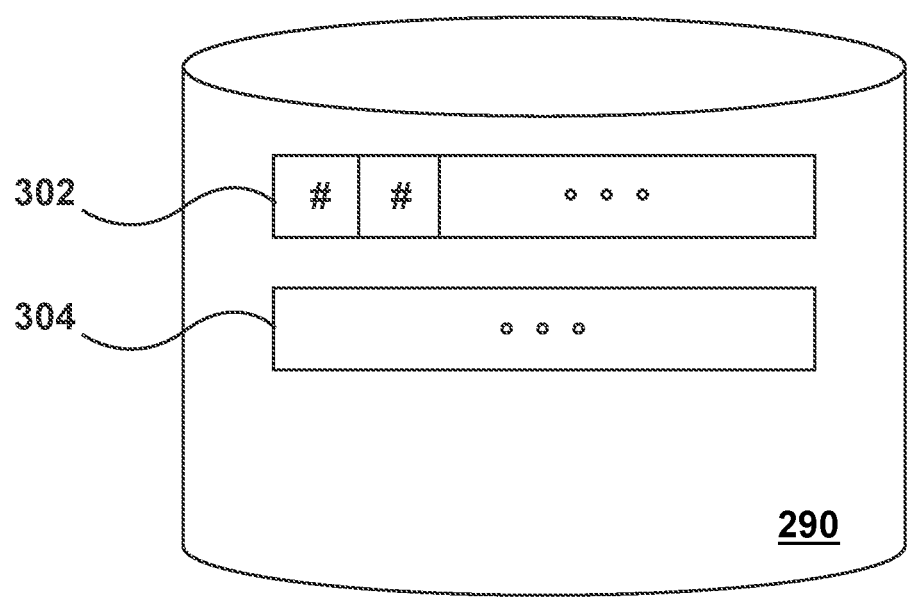
FIG. 3 depicts a rendering rule database maintained by a map application that is executed by the electronic device of FIG. 1, the rendering rule database being executed in accordance with some non-limiting embodiments of the present technology.

To that end, in accordance with the non-limiting embodiments of the present technology, the map application 270 is configured to maintain a rendering rule database 290. With reference to FIG. 3, the map application 270 is configured to generate and store in the rendering rule database 290 a rendering rule 302. The at least one rendering rule prescribes (i) a total number of POI labels to be rendered within a given viewport of the map; (ii) a number of POI labels to be rendered using label rendering type; and (ii) a remainder of the POI labels of the total number of POI labels renderable using a second label rendering type and/or a third label rendering type (it is noted that there could be a different total number of the label rendering types). The nature and example of the different label rendering types will be described herein below.

It is noted that the rendering rule database 290 can have a number of additional rendering rules 304. For example, the additional rendering rules 304 can specify additional rendering rules for different zoom levels (or for sets of zoom levels).

As a non-limiting example, additional rendering rules 304 can specify how many POI labels of each of the first label rendering type, the second label rendering type and the third label rendering type are to be rendered. In some embodiments of the present technology, the rendering rules is pre-determined for different zoom levels (or sets of zoom levels) of the viewport of the map.

More specifically, for different zoom levels, the rendering rules determine how many (if any) of the POI labels of the first label rendering type, the second label rendering type and the third label rendering type are to be rendered. As an example only, the additional rendering rules 304 can prescribe that:

for zoom levels 0-7 no POI labels are displayed (the map depicts a small-scale view of a large map view, POI labels would make no sense to the user of the electronic device);
for zoom levels 9-10, all POI labels are to be rendered using the third label rendering type only;
for zoom levels 11-13, all POI labels are to be rendered using either the third label rendering type or the second label rendering type (based on their relevancy);
for zoom levels 14-18, POI labels are to be distributed between the first label rendering type, the second label rendering type and the third label rendering type in a pre-determined ration base on their relevancy; for example, five POI labels of the first label rendering type, five POI labels of the second label rendering type and remainder POI labels (to the maximum of twenty in total) of the third label rendering type.

Label Rendering Types

Figure 4:
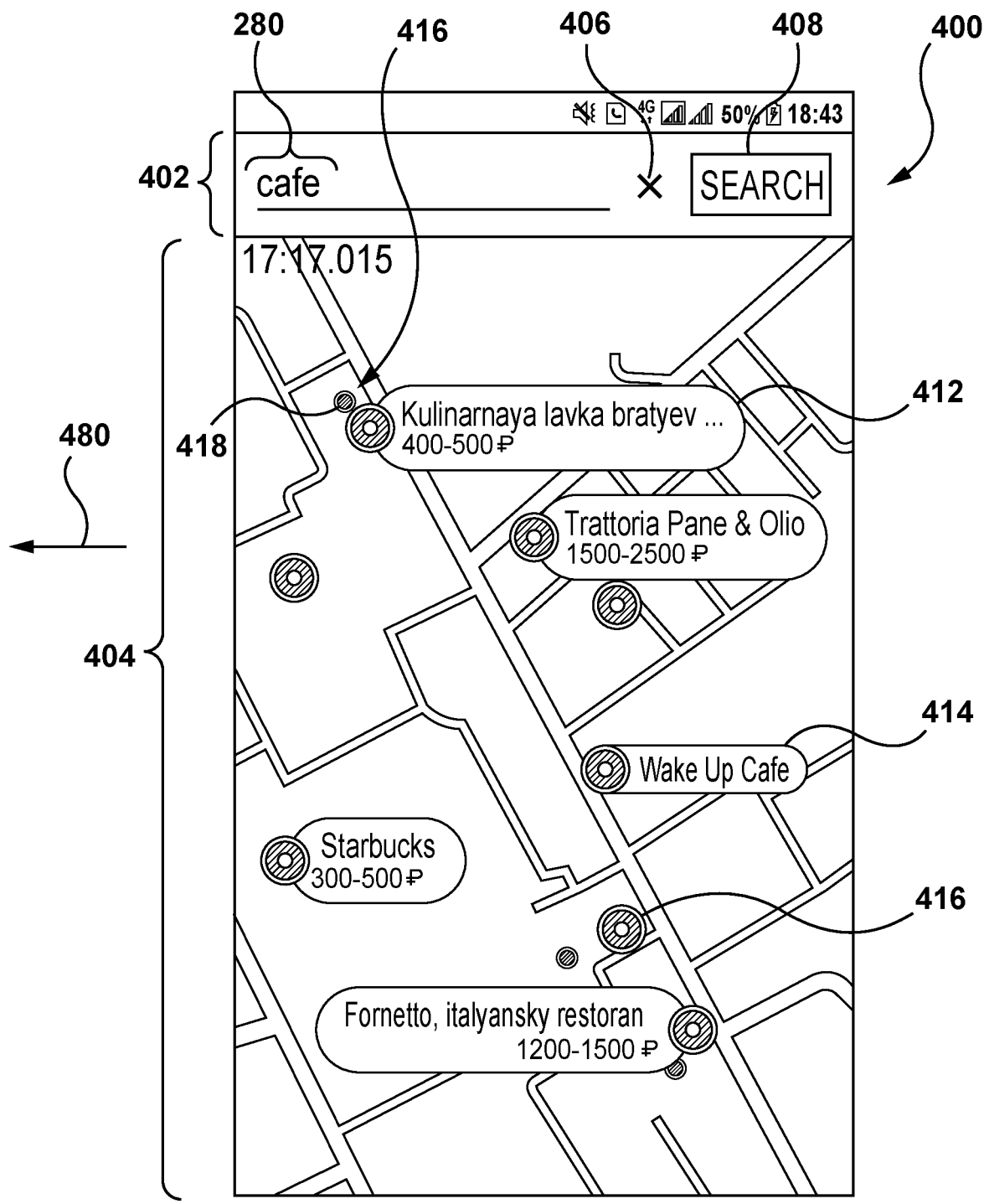
FIG. 4 depicts a screen shot of an output of the map application executed by the map application of the electronic device of FIG. 1, the screen shot depicting a particular map viewport.

With reference to FIG. 4, examples of the different types of label rendering types will now be described. FIG. 4 depicts a screen shot of a screen of the electronic device 100. The electronic device 100 executes the map application 270. Depicted within FIG. 4 is a map interface 400. The map interface 400 has a query interface 402 and a map display area 404.

Depicted within the map display area is a particular viewport of the map that is displayed by the map application 270. The viewport is associated with a particular map area displayable within the viewport, as well as a particular zoom level (in this illustration, the zoom level is "17"). Both the map area and the zoom level are parameters selectable by the user of the electronic device 100 using the map application 270. The map area is selectable by the user by entering geo coordinates or using a "near me function" that displays the map areas associated with the current geo position of the electronic device 100.

The query interface 402 allows the user to enter an indication of a geo-query. In the depicted example, the user has entered the indication of the geo-query "café". The query interface further includes a delete button 406 and a search button 408 that allow the user to clear the query interface 402 and to submit the geo-query, respectively.

In response to the user "submitting" the geo-query, the map application 270 generates the aforementioned geo-search request 280 and then receives the aforementioned map data packet 285; processes the map data packet 285 to generate POI labels 410 that are displayable within the map interface 400 overlaid over the map data. How the map application 270 processes the map data packet 285 will be described below. For the time being, we will focus on the type of label rendering types.

For the sake of illustration, the POI labels 410 include a first POI label 412, a second POI label 414, a third POI label 416 and a fourth POI label 418. Each of the first POI label 412, the second POI label 414, the third POI label 416 and the fourth POI label 418 have been rendered using a different label rendering type. In the illustrated embodiments, the first POI label 412 has been rendered using a first label rendering type, the second POI label 414 has been rendered using a second label rendering type, the third POI label 416 has been rendered using a third label rendering type and the fourth POI label 418 has been rendered using a fourth label rendering type.

In the illustrated embodiment, each of the first label rendering type, the second label rendering type, the third label rendering type, and the fourth label rendering type are different therebetween. In accordance with embodiments of the present technology, the first label rendering type, the second label rendering type, the third label rendering type, and the fourth label rendering type are selected to present different visual significance for the associated POIs. In the depicted example, the visual significance progressively decreases through the first label rendering type, the second label rendering type, the third label rendering type, and the fourth label rendering type.

As an illustration, in the depicted example, the level of information presented in the first label rendering type, the second label rendering type, the third label rendering type, and the fourth label rendering type progressively decreases to give affect to the progressively decreasing visual significance.

As an example, the first label rendering type is for rendering the first POI label 412 with a graphical indication of the associated POI type (in this case, a large round dot), a name of the associated POI and auxiliary information associated with the associated POI (in this case a range for an average bill. It is noted that in addition to the first POI label 412 having been rendered using the first label rendering type, there are three additional POI labels (not numbered) that have been rendered using the first label rendering type. The first POI label 412 and the three additional POI labels can be said to be visually most significant, as they as associated with POI labels having the most information. What this indicates to the user is that the POIs depicted with the first POI label 412 and the three additional POI labels are most relevant to the geo-query that has been submitted using the query interface 402 (i.e. the geo-query "cafe").

The second label rendering type is for rendering the second POI label 414 with a graphical indication of the associated POI type (in this case, a large round dot) and a name of the associated POI. It is noted that unlike the POI labels associated with the first POI label 412 and the three additional POI labels, the second POI label 414 does not contain auxiliary information about the associated POI. It can be said that the second POI label 414 is visually less significant than the first POI label 412 and three additional POIs labels. Thus, what this indicates to the user is that the POI associated with the second POI label 414 is comparatively less relevant to the geo-query that has been submitted using the query interface 402, when compared to the POIs depicted with the first POI label 412 and the three additional POI labels.

The third label rendering type is for rendering the third POI label 416 with a graphical indication of the associated POI type (in this case, a large round dot with a smaller dot inside). It is noted that unlike the POI labels associated with the first label rendering type and the second label rendering type, the third POI label 416 does not contain the title and the auxiliary information about the associated POI. It can be said that the third POI label 416 is visually less significant than the second POI label 414, and even less visually significant than the first POI label 412 and three additional POI labels. Thus, what this indicates to the user is that the POI associated with the third POI label 416 is comparatively less relevant to the geo-query that has been submitted using the query interface 402, when compared to the POIs depicted with the first POI label 412, the three additional POI labels and the second POI label 414.

The fourth label rendering type is for rendering the fourth POI label 418 with a graphical indication of the associated POI type (in this case, a small round dot). It is noted that unlike the POI labels associated with the first label rendering type, the second label rendering type and the third rendering type, the fourth POI label 418 does not contain the title and the auxiliary information about the associated POI. It is also noted that the fourth POI label 418 is visually smaller. It can be said that the fourth POI label 418 is visually less significant than the third POI label 416, the second POI label 414, and even less visually significant than the first POI label 412 and three additional POI labels. Thus, what this indicates to the user is that the POI associated with the fourth POI label 418 is comparatively less relevant to the geo-query that has been submitted using the query interface 402, when compared to the POIs depicted with first POI label 412, the three additional POI labels, the second POI label 414 and the third POI label 416.

It should be noted that the means to affect the progressive decreasing of the visual significance can be other than progressively decreasing level of information. As such, it is contemplated that the means to affect the progressive decreasing of the visual significance can be implemented as visual form factor, color coding, an alpha-numerical indication of the significance, etc.

POI Label Generating Process (First Set)

We will now turn our attention to how the set of POI labels rendered in the map display area 404 depicted in FIG. 4 has been generated.

The map application 270 generates the geo-search request 280 in response to the map application 270 receiving the geo-search request 280 from the user of the electronic device 100. For example, the user may have entered using a user interface (such as a touchscreen or a key board) into the map application 270 an indication of the geo-search request 280: "cafe".

The geo-search request 280 that is generated by the map application 270 contains indication of the user's geo-search request (i.e. "cafe"), as well as an indication of geo-coordinates associated with the electronic device 100. As an example, the map application 270 may generate the geo-coordinates using the GPS module 150 of the electronic device 100. For example, in response to the user entering the above-mentioned geo-search request 280 and clicking the search button 408, the map application 270 may trigger the GPS module 150 to acquire the current geo-location from the GPS satellite 250.

The map application 270 then transmits the geo-search request 280 to the map server 230 (as is depicted in FIG. 1).

In response to receiving the geo-search request 280, the map server 230 generates a set of ranked search results that are responsive to the geo-search request 280. In some embodiments of the present technology, the map server 230 executes a Machine Learning Algorithm (MLA) that is configured to conduct a search and to generate a ranked list of search results. In accordance with non-limiting embodiments of the present technology, the MLA of the map server generates the set of ranked search results that contains a number of POIs, each POI being responsive to the geo-search request 280. In the above mentioned example of the geo-search request 280: being "cafe", each POI in the set of ranked search results can be associated with a restaurant or a café that is located within a pre-determined geographical range from the geo-coordinates, an indication of which was transmitted as part of the geo-search request 280.

The MLA of the map server 230 is configured to execute a ranking formula to determine which POIs are more relevant to the user's geo-search request 280. For example, the geo-search request 280 may be "cafe", in which case the MLA can rank the POIs based on general popularity of the café in the associated geographical area based on other user's past searches, based on comments left by the user, etc.

The map server 230 then transmits the map data packet 285 to the electronic device 100. In accordance with non-limiting embodiments of the present technology, the map data packet 285 contains the set of ranked search results. Each result in the set of ranked search result contains: (i) an indication of an associated POI, (ii) geo-coordinates associated with the associated POI for positioning it on the map, (iii) POI information associated with the associated POI. In accordance with some embodiments of the present technology, the total number of the search results in the set of ranked results can be pre-defined, such as ten, fifteen, twenty results or any other suitable number thereof.

The map application 270 of the electronic device 100 receives, from the map server 230, the map data packet 285, the map data packet 285 containing a first ranked set of search results, each search result having: an indication of an associated geographical point of interest (POI) that is responsive to the geo-search query, the associated POI having a geo-position within a given viewport of the map displayable on the electronic device; and POI information of the associated POI, at least a portion of the POI information renderable on the electronic device as a POI label of the associated POI.

The map application 270 then determines a rendering rule for rendering POI labels on the electronic device 100. More specifically, the map application 270 accesses the aforementioned rendering rule database 290 and retrieves the rendering rule 302 and/or the additional rendering rules 304 from the rendering rule database 290.

The map application 270 then analyzes the rendering rule contained in the rendering rule 302 and/or the additional rendering rules 304, which rendering rule is for defining: a total number of POI labels to be displayed within the given viewport; a first number of the total number of POI labels indicating of POI labels to be rendered using a first label rendering type, the first label rendering type having a first subset of POI information; a remainder of the total number of POI labels renderable using a second label rendering type, the second label rendering type having a second subset of POI information.

The map application 270, then for a given POI of first ranked set of search results, determines based on the rendering rule a POI-label rendering instruction, the POI-label rendering instruction for causing the electronic device to render an associated POI label in one of the first label rendering type and the second label rendering type, the determining comprising: in response to the given POI being in the first number of top ranked search results of the first ranked set of search results, determining that the given POI should be rendered with the first label rendering type; in response to the given POI not being in the first number of top ranked search results first ranked set of search results, determining that the given POI should be rendered with the second label rendering type.

The map application 270 then, based on the POI-label rendering instructions, renders POI labels to be overlaid in the given viewport.

In the depicted example of FIG. 4, the map application 270 renders: three POI labels using the first label rendering type (the first POI label 412 being an enumerated example thereof), one POI label using the second label rendering type (the second POI label 414 being an enumerated example thereof), three POI labels using the third label rendering type (the third POI label 416 being an enumerated example thereof), and three POI labels using the fourth label rendering type (the fourth POI label 418 being an enumerated example thereof).

In some embodiments of the present technology, the map application 270 can additionally execute a collision detection as part of rendering of the POI labels. The map application 270 processes the POI labels based on their ranked order within the set of search results (the ranked order is generated by the map server 230). The map application 270 checks for collision for each next POI label to be rendered for its collision with an already rendered POI label(s), as well as for the edges of the viewport that the POI label is to be rendered in.

In case the map application 270 determines a collision for the next POI label to be rendered using its label rendering type prescribed by the rendering rule and the rank of the next POI in the ranked search result set, the map application 270 checks if collision can be avoided by rendering the POI label using the next (lower) label rendering type. The map application 270 repeats the collision checking routine until the map application 270 determines the suitable label rendering type or determines that the next POI can not be rendered at all. It should be noted that the collision detection routine provides an exception to the rendering rules, as the avoidance of visual overlaps is superior to the order of label rendering types prescribed by the rendering rule.

Let's take an example of the first POI label 412 and the fourth POI label 418. The first POI label 412 has been rendered using the first label rendering type and the fourth POI label 418 has been rendered using the fourth label rendering type. Under one scenario, this may be a result of the first POI label 412 being associated with a highly relevant POI, while the fourth POI label 418 being associated with a much less relevant POI (i.e. POI that is less relevant than those POI that have been rendered using the first label rendering type, the second label rendering type and the third label rendering type).

On the other hand, rendering the fourth POI label 418 using the fourth label rendering type may have been in response to the application by the map application 270 executing the collision detection routine.

Let's assume that the map application 270 has rendered the first POI label 412 (previously rendered POI label) using the first label rendering type. Now, when analyzing the fourth POI label 418 (the next rendered POI label), the map application 270 analyzes the rendering rule 302 and determines that the fourth POI label 418 should be rendered using the first label rendering type as well.

The map application 270 then executes the collision detection routine—it determines if there would be an overlap (i.e. a collision) between the first POI label 412 and the fourth POI label 418, of the fourth POI label 418 were to be rendered using the first POI rendering type, as prescribed by the rendering rule 302. In this example, the map application 270 would detect that indeed there would be such a collision.

The map application 270 then repeats the execution of the collision detection routine—the map application 270 determines if there would be an overlap (i.e. a collision) between the first POI label 412 and the fourth POI label 418, of the fourth POI label 418 were to be rendered using the next POI rendering type—the second POI rendering type. In this example, the map application 270 would detect that indeed there would be such a collision.

The map application 270 then repeats the execution of the collision detection routine—the map application 270 determines if there would be an overlap (i.e. a collision) between the first POI label 412 and the fourth POI label 418, of the fourth POI label 418 were to be rendered using the next POI rendering type—the third POI rendering type. In this example, the map application 270 would detect that indeed there would be such a collision.

Finally, the map application 270 then repeats the execution of the collision detection routine—the map application 270 determines if there would be an overlap (i.e. a collision) between the first POI label 412 and the fourth POI label 418, of the fourth POI label 418 were to be rendered using the next POI rendering type—the fourth POI rendering type. In this example, the map application 270 would detect that indeed there would be no such collision and, therefore, the map application 270 renders the fourth POI label 418 using the fourth label rendering type.

Now, it should be noted that should the map application 270 have detected that indeed there would be such collision even if the fourth POI label 418 were to be rendered using the fourth label rendering type, the map application 270 would not render the fourth POI label 418 (or check if the fourth POI label 418 could have been rendered using the next rendering type, is such next label rendering type was defined).

It should also be noted that the collision detection can be executed in respect to the other POI labels, as well as to the edges of the viewport visible area.

POI Label Generating Process (Second Set)

Now, we have described how the map application 270 has generated the viewport depicted in FIG. 4.

We will now turn our attention to processing additional sets of ranked search results. In some embodiments of the present technology, the additional sets of ranked search results can be received by the electronic device 100 in response to the user executing a different search for the same viewport. In other embodiments of the present technology, the additional sets of ranked search results can be received by the electronic device 100 in response to the user changing the viewport (i.e. one or both of the visible view area and the zoom level).

Figure 5:
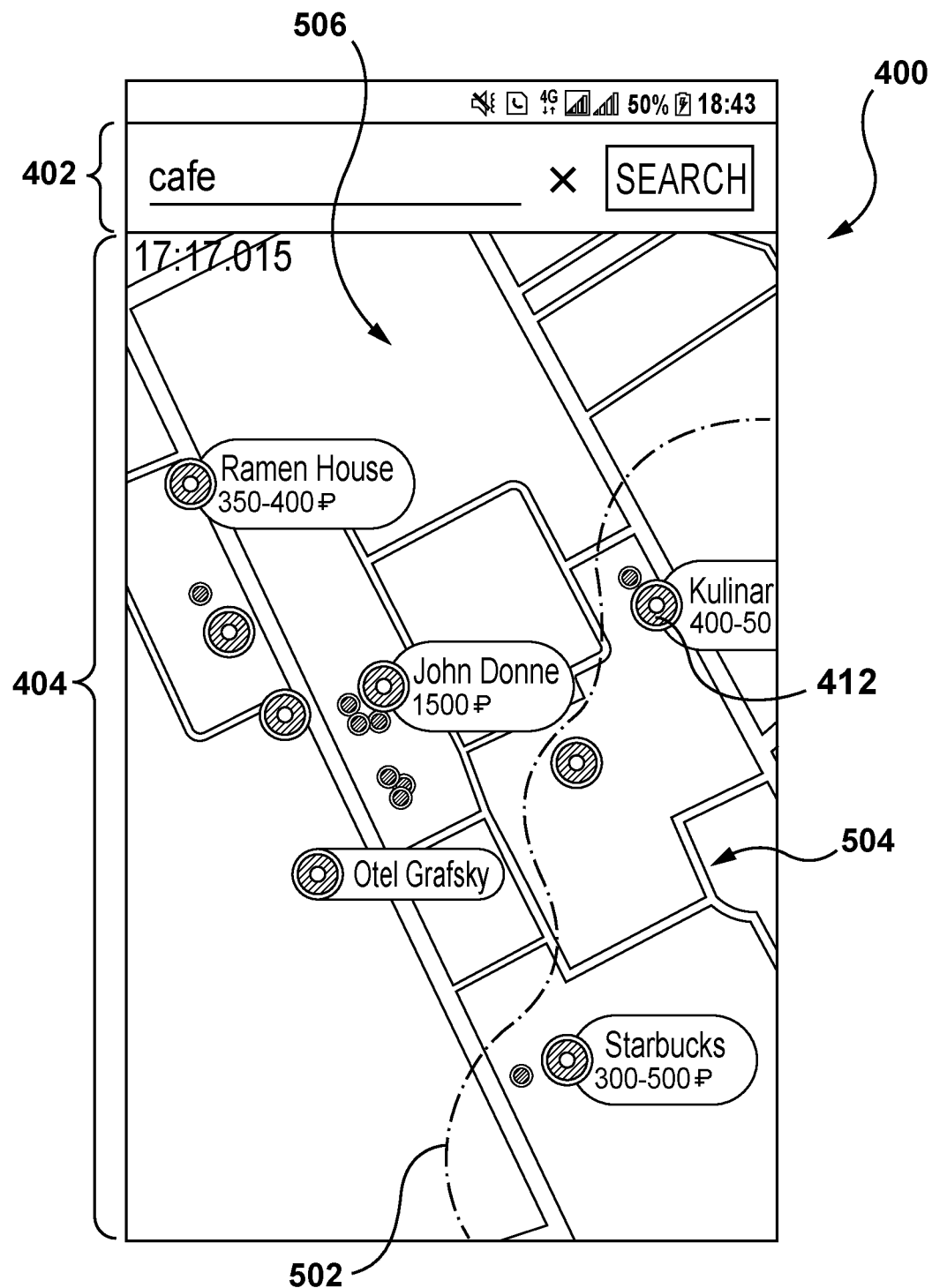
FIG. 5 depicts a screen shot of an output of the map application executed by the map application of the electronic device of FIG. 1, the screen shot depicting another map viewport.

Depicted within FIG. 5 is the map interface 400. The map interface 400 has the query interface 402 and the map display area 404. Depicted within the map display area is a particular viewport of the map that is displayed with the map application 270. The viewport is associated with a new particular map area displayable within the viewport (the new particular map area being in a direction 480 depicted in FIG. 4 relative to the particular map area of FIG. 4), as well as the particular zoom level (in this illustration, the zoom level has remained unchanged at "17").

The new particular map area can be selected by the user by "dragging" (or otherwise actuating) the map interface 400 in the direction 480. In response to the user changing the viewport, the map application 270 generates another instance of the geo-search request 280 and the map server 230 returns another instance of the map data packet 285. The other instance of the map data packet 285 comprises a second set of ranked search results, which in this example partially overlaps with the first set of ranked search results.

It is noted when the map application 270 processes the second set of ranked search results, if the map application 270 determines that the second set of ranked search results contains POI that have already been rendered in the previous viewport and are still renderable within the new viewport, the map application 270 renders them using the same label rendering type with which they have been previously rendered, unless the new viewport has a new zoom level which is associated with the rendering rule that prohibits using the given label rendering type.

More specifically, the map application 270 first calculates a label rendering type density parameter for the new viewport, the label rendering type density parameter being indicative of a number of POI labels of both the first label rendering type and the second label rendering type still displayed within the new viewport.

The map application 270 then selects from the second ranked plurality of search results, POIs that have not already been rendered (i.e. they are not part of the POI labels that have been previously rendered and are still renderable, i.e. viewable, in the new viewport).

The map application 270 then, based on the label rendering type density parameter, modifies the rendering rule to determine a modified rendering rule, the modified rendering rule for defining a new first number of the total number of new POI labels to be rendered using the first label rendering type. For example, if the rendering rule was to render five POI labels using the first label rendering type and the label rendering type density parameter is indicative of the three POI labels already rendered using the first label rendering type, the map application 270 generates a modified rendering rule that prescribes that two new POIs are to be rendered using the first label rendering type.

The map application 270 then, for a given new POI of the set of new POIs, determines a new POI-label rendering instruction by: in response to a given new POI being in the new first number of top second ranked search results, determining that the given new POI should be rendered with the first label rendering type; in response to the given new POI not being in the new first number of top second ranked search results, determining that the given new POI should be rendered with the second label rendering type. The map application 270 then, based on the new POI-label rendering instructions, renders new POI labels to be overlaid within the given viewport and the modified viewport.

In FIG. 5, there is depicted a line 502 that separates a first area 504 with previously rendered POI labels (including the first POI label 412) and a second area 506 with the newly rendered POI labels that are associated with new POIs received as part of the second set of ranked search results.

Zoom Levels Description

Figure 6:
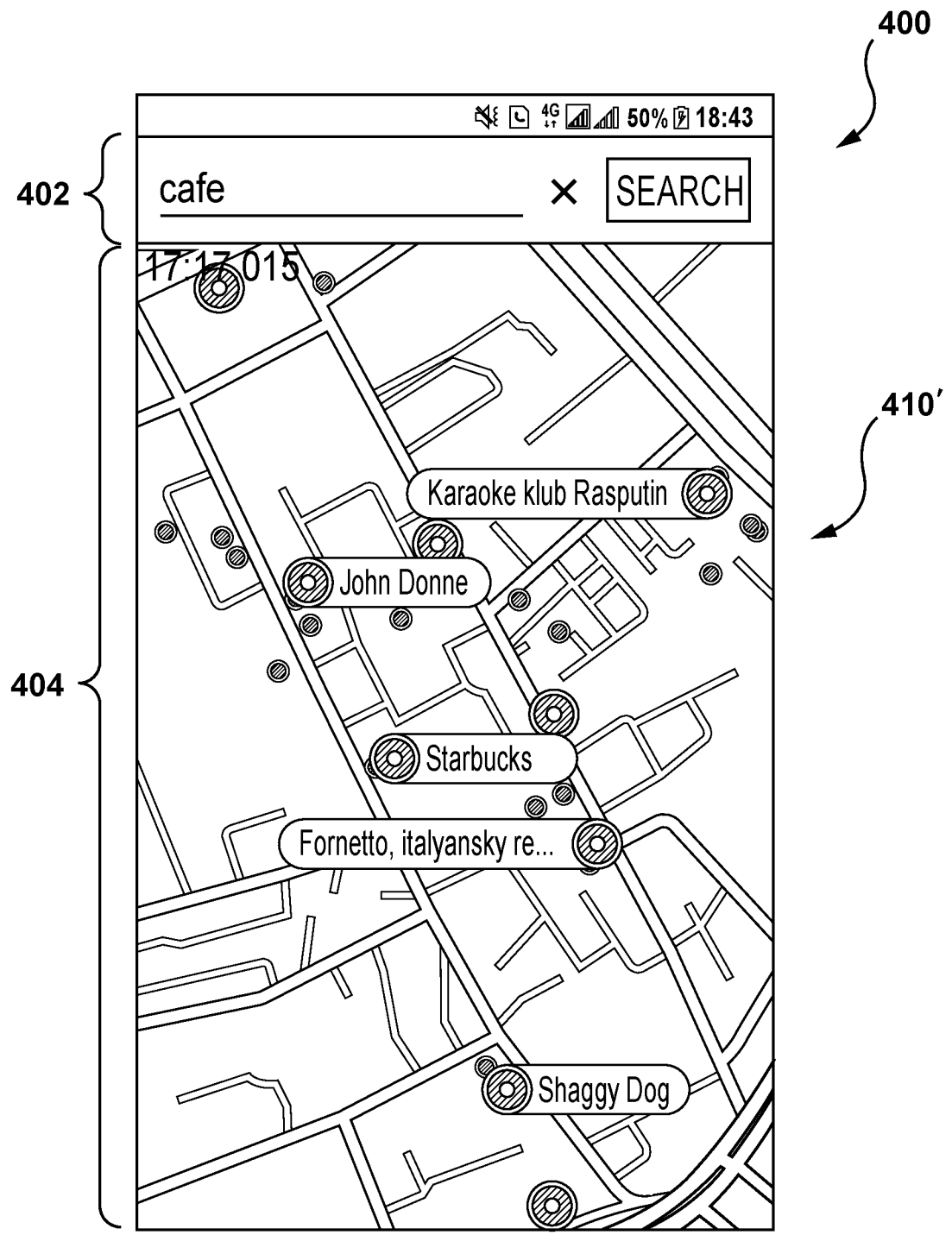
FIG. 6 depicts a screen shot of an output of the map application executed by the map application of the electronic device of FIG. 1, the screen shot depicting yet another map viewport.

Now, with reference to FIG. 6, the map interface 400 has been actuated to a new zoom level (in this example, zoom level 13). This illustrates a zoom level that prescribes, as part of the number of additional rendering rules 304 no POI labels of the first label rendering type. As such, all POI labels that have been rendered using the first label rendering type are now rendered using the second label rendering type.

Figure 7:
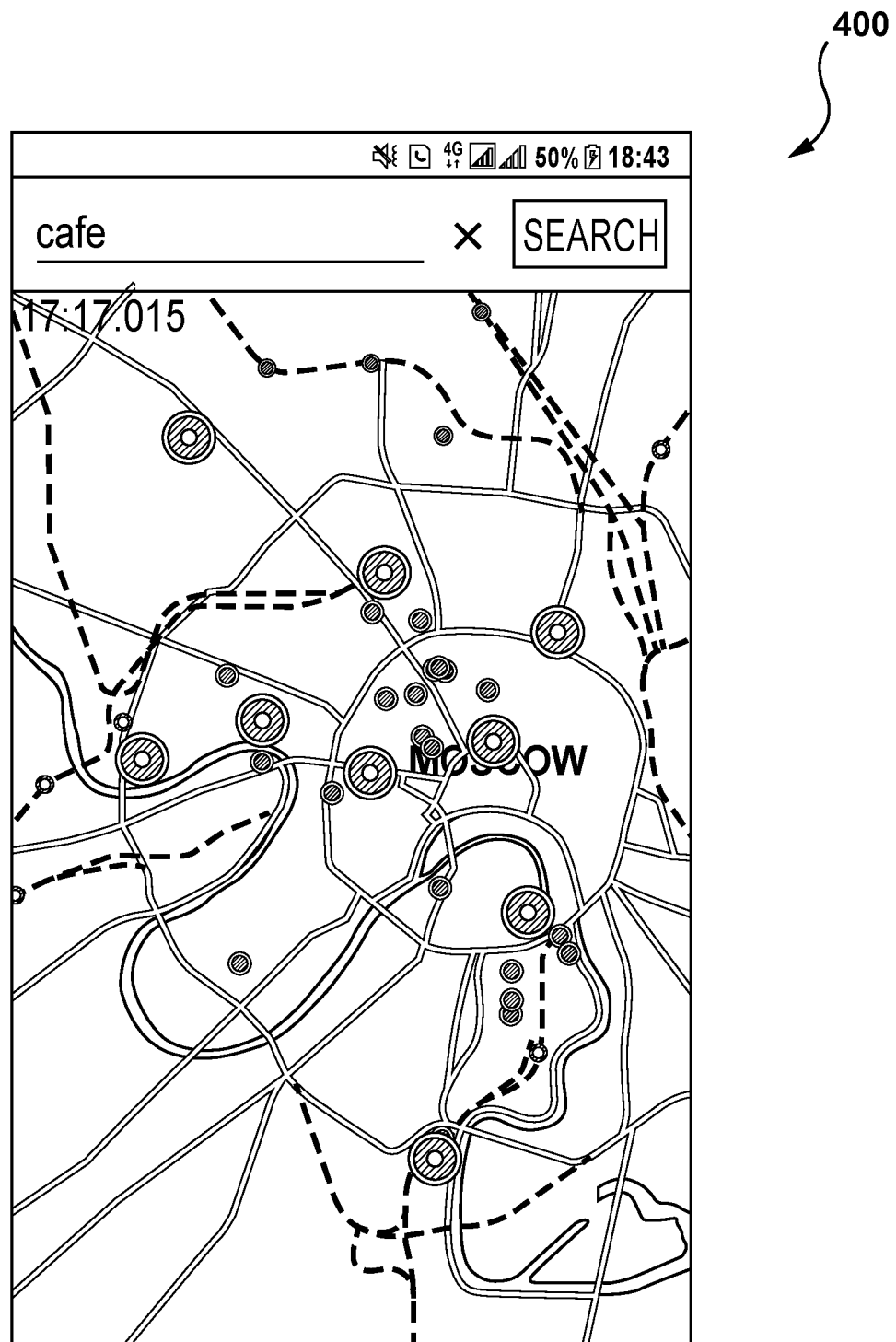
FIG. 7 depicts a screen shot of an output of the map application executed by the map application of the electronic device of FIG. 1, the screen shot depicting yet another map viewport.
Figure 8:
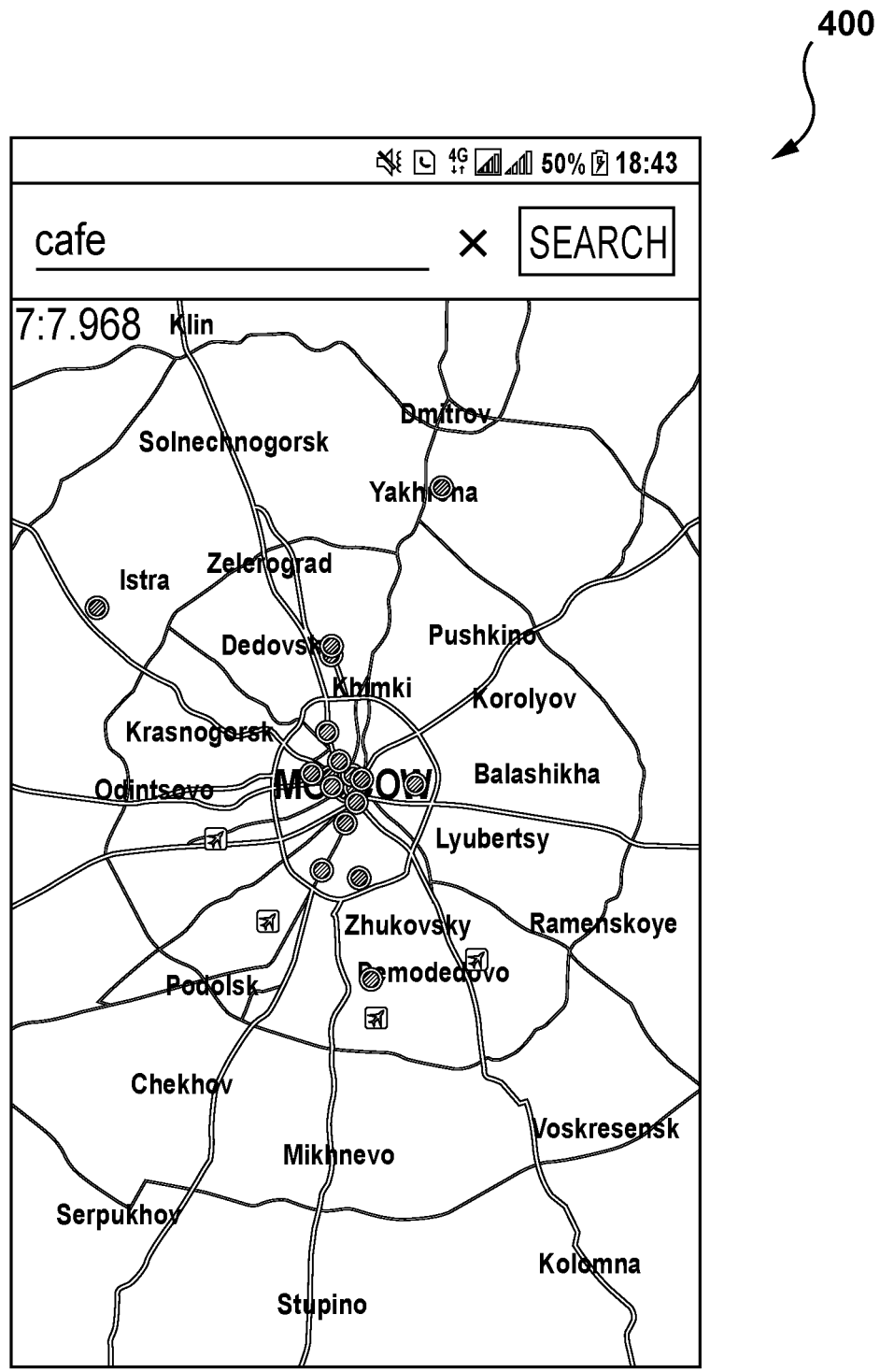
FIG. 8 depicts a screen shot of an output of the map application executed by the map application of the electronic device of FIG. 1, the screen shot depicting yet another map viewport.

FIG. 7 and FIG. 8 depict examples of the map interface 400 when the user further changes the zoom level. Within the FIG. 7 illustration, all POI labels are rendered using a mix of the third label type and the fourth label type; while within the illustration of FIG. 8, all POI labels are rendered using the fourth label rendering type.

Figure 9:
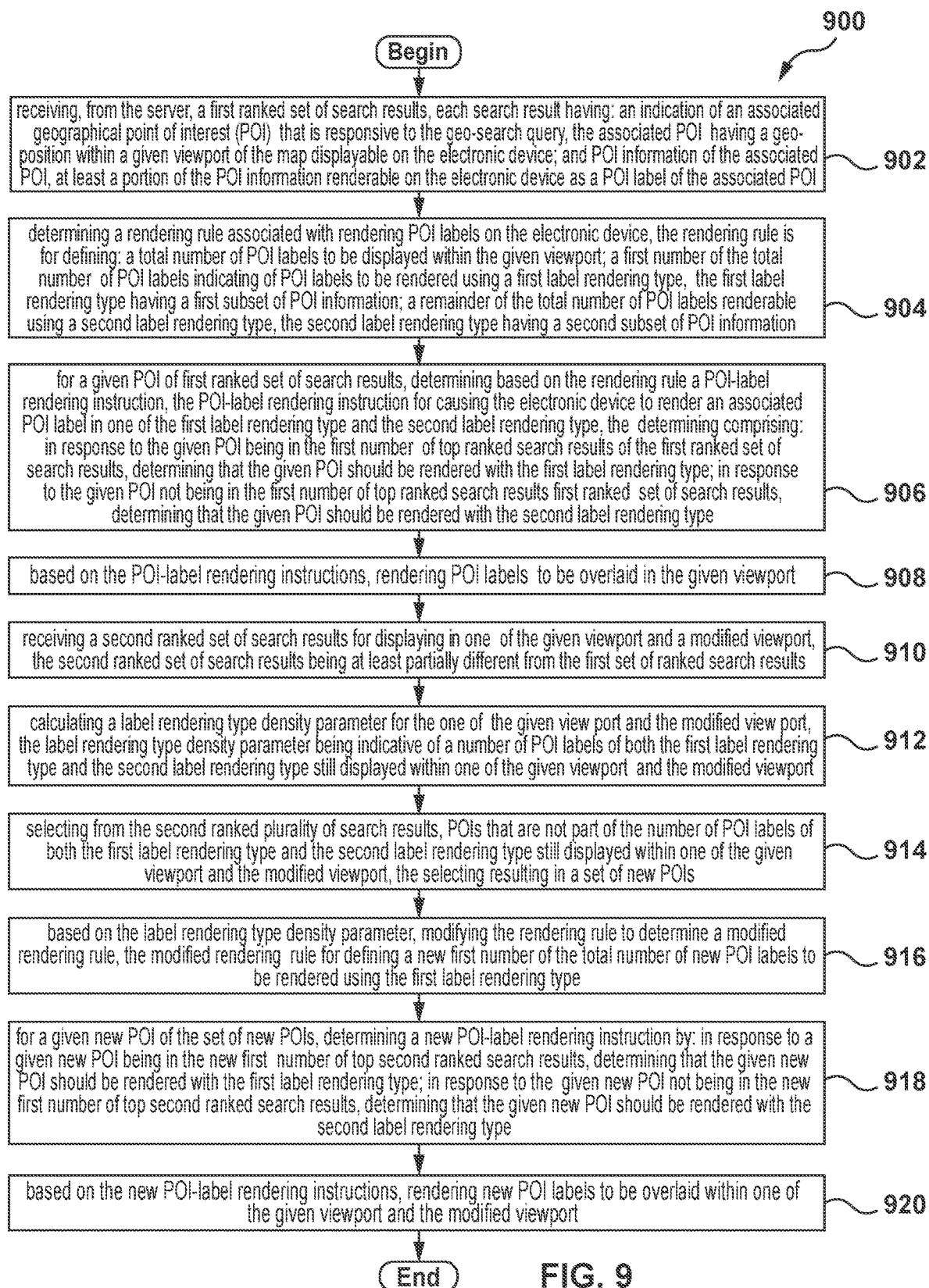
FIG. 9 depicts a block diagram of a flow chart of a method being executed within the networked computing environment of FIG. 2 by the electronic device of FIG. 1, the method being implemented in accordance with non-limiting embodiments of the present technology.

Given the architecture described above, it is possible to execute a method for rendering search results on a map displayable on the electronic device 100. With reference to FIG. 9, there is depicted a block diagram of a flow chart of a method 900, the method 900 being executable in accordance with non-limiting embodiments of the present technology. Within implementations of the method 900 and has been alluded to above, the search results are received from the map server 230 by the map application 270 executable by the electronic device 100 responsive to a geo-search query associated with the map application 270.

Step 902—Receiving, from the Server, a First Ranked Set of Search Results, Each Search Result Having an Indication of an Associated Geographical Point of Interest (POI) that is Responsive to the Geo-Search Query, the Associated POI Having a Geo-Position within a Given Viewport of the Map Displayable on the Electronic Device; and POI Information of the Associated POI, at Least a Portion of the POI Information Renderable on the Electronic Device as a POI Label of the Associated POI The method 900 begins at step 902, where map application 270 receives, from the map server 230, a first ranked set of search results, each search result having an indication of an associated geographical point of interest (POI) that is responsive to the geo-search query (as part of the geo-search request 280), the associated POI having a geo-position within a given viewport of the map displayable by the map application 270 executable on the electronic device 100; and POI information of the associated POI, at least a portion of the POI information renderable on the electronic device as a POI label of the associated POI.

It is noted that in some embodiments of the present technology, the map application 270 receives the first ranked set of search results (as part of the map data packet 285) in response to transmitting the geo-search request 280 to the map server 230.

In some embodiments of the present technology, the POI information includes at least a POI-identifier, a POI-description and auxiliary-POI-data.

In some embodiments of the present technology, the first sub-set of POI information includes at least the POI-identifier and the POI-description; and the second subset of POI information includes only the POI-identifier. In other words, it can be said that the first sub-set of POI information is at least partially different from the second subset of POI information. In a specific non-limiting embodiment, it can be said that the first sub-set of POI information is larger than the second subset of POI information.

Step 904—Determining a Rendering Rule Associated with Rendering POI Labels on the Electronic Device, the Rendering Rule is for Defining: A Total Number of POI Labels to be Displayed within the Given Viewport; a First Number of the Total Number of POI Labels Indicating of POI Labels to be Rendered Using a First Label Rendering Type, the First Label Rendering Type Having a First Subset of POI Information; a Remainder of the Total Number of POI Labels Renderable Using a Second Label Rendering Type, the Second Label Rendering Type Having a Second Subset of POI Information At step 904, the map application 270 determines determining a rendering rule associated with rendering POI labels on the electronic device 100, the rendering rule is for defining: a total number of POI labels to be displayed within the given viewport; a first number of the total number of POI labels indicating of POI labels to be rendered using a first label rendering type, the first label rendering type having a first subset of POI information; a remainder of the total number of POI labels renderable using a second label rendering type, the second label rendering type having a second subset of POI information.

In an example of the implementation of step 904, the map application 270 accesses the rendering rule database 290 to retrieve one or more of the rendering rule 302 and the additional rendering rules 304. By analyzing the one or more of the rendering rule 302 and the additional rendering rules 304, the map application 270 determines the specific rendering rules for the viewport that is currently being displayed by the map application 270.

Step 906—for a Given POI of First Ranked Set of Search Results, Determining Based on the Rendering Rule a POI-Label Rendering Instruction, the POI-Label Rendering Instruction for Causing the Electronic Device to Render an Associated POI Label in One of the First Label Rendering Type and the Second Label Rendering Type, the Determining Comprising: In Response to the Given POI being in the First Number of Top Ranked Search Results of the First Ranked Set of Search Results, Determining that the Given POI should be Rendered with the First Label Rendering Type; in Response to the Given POI not being in the First Number of Top Ranked Search Results First Ranked Set of Search Results, Determining that the Given POI should be Rendered with the Second Label Rendering Type At step 906, for a given POI of first ranked set of search results, the map application 270 determines based on the rendering rule a POI-label rendering instruction, the POI-label rendering instruction for causing the electronic device to render an associated POI label in one of the first label rendering type and the second label rendering type, the determining comprising: in response to the given POI being in the first number of top ranked search results of the first ranked set of search results, determining that the given POI should be rendered with the first label rendering type; in response to the given POI not being in the first number of top ranked search results first ranked set of search results, determining that the given POI should be rendered with the second label rendering type.

Step 908—Based on the POI-Label Rendering Instructions, Rendering POI Labels to be Overlaid in the Given Viewport At step 908, the map application 270, based on the POI-label rendering instructions, renders POI labels to be overlaid in the given viewport.

Step 910—Receiving a Second Ranked Set of Search Results for Displaying in One of the Given Viewport and a Modified Viewport, the Second Ranked Set of Search Results being at Least Partially Different from the First Set of Ranked Search Results At step 910, the map application receives a second ranked set of search results for displaying in one of the given viewport and a modified viewport, the second ranked set of search results being at least partially different from the first set of ranked search results.

As has been described above, the additional sets of ranked search results can be received by the electronic device 100 in response to the user executing a different search for the same viewport. In other embodiments of the present technology, the additional sets of ranked search results can be received by the electronic device 100 in response to the user changing the viewport (i.e. one or both of the visible view area and the zoom level).

Step 912—Calculating a Label Rendering Type Density Parameter for the One of the Given View Port and the Modified View Port, the Label Rendering Type Density Parameter being Indicative of a Number of POI Labels of Both the First Label Rendering Type and the Second Label Rendering Type Still Displayed within the Given Viewport and the Modified Viewport At step 912, the map application 270 calculates a label rendering type density parameter for the one of the given view port and the modified view port, the label rendering type density parameter being indicative of a number of POI labels of both the first label rendering type and the second label rendering type still displayed within the given viewport and the modified viewport.

Step 914—Selecting from the Second Ranked Plurality of Search Results, POIs that are not Part of the Number of POI Labels of Both the First Label Rendering Type and the Second Label Rendering Type Still Displayed within the Given Viewport and the Modified Viewport, the Selecting Resulting in a Set of New POIs At step 914, the map application processes the "new" or "unprocessed" POIs by selecting from the second ranked plurality of search results, POIs that are not part of the number of POI labels of both the first label rendering type and the second label rendering type still displayed within the given viewport and the modified viewport, the selecting resulting in a set of new POIs.

Step 916—Based on the Label Rendering Type Density Parameter, Modifying the Rendering Rule to Determine a Modified Rendering Rule, the Modified Rendering Rule for Defining a New First Number of the Total Number of New POI Labels to be Rendered Using the First Label Rendering Type At step 916, the map application 270, based on the label rendering type density parameter, modifies the rendering rule to determine a modified rendering rule, the modified rendering rule for defining a new first number of the total number of new POI labels to be rendered using the first label rendering type.

In some embodiments of the present technology, the modified rendering rule is instrumental in causing the map application 270 to execute rendering new POI labels to be overlaid within the given viewport and the modified viewport while keeping POI labels of both the first label rendering type and the second label rendering type still displayed within the given viewport and the modified viewport.

Step 918—for a Given New POI of the Set of New POIs, Determining a New POI-Label Rendering Instruction by: In Response to a Given New POI being in the New First Number of Top Second Ranked Search Results, Determining that the Given New POI should be Rendered with the First Label Rendering Type; in Response to the Given New POI not being in the New First Number of Top Second Ranked Search Results, Determining that the Given New POI should be Rendered with the Second Label Rendering Type At step 918, for a given new POI of the set of new POIs, the map application 270 determines a new POI-label rendering instruction by: in response to a given new POI being in the new first number of top second ranked search results, determining that the given new POI should be rendered with the first label rendering type; in response to the given new POI not being in the new first number of top second ranked search results, determining that the given new POI should be rendered with the second label rendering type.

Step 920—Based on the New POI-Label Rendering Instructions, Rendering New POI Labels to be Overlaid within the Given Viewport and the Modified Viewport At step 920, based on the new POI-label rendering instructions, the map application renders new POI labels to be overlaid within the given viewport and the modified viewport.

In some embodiments of the present technology, the map application 270 renders POI labels to be overlaid in the given viewport in an order of the search results in the first ranked set of search results. As part of the rendering of the POI labels, the map application 270 can execute a collision detection routine. More specifically, the map application 270 for each next POI label, checks for overlap with previously rendered POI labels; and in response to detecting the overlap, modifying rendering instruction for the next POI label.

As an example, as part of the POI-rendering instruction, in response to the POI-rendering instruction being modified is for rendering the POI label using the first label rendering type, the map application 270 can change the first label rendering type to one of the second label rendering type and a third label rendering type; the third label rendering type being one of: (i) having a third subset of POI information; the third sub-set of POI information being smaller than the second subset of POI information, and (ii) having a different graphical form-factor having a smaller footprint than a form-factor of the second label rendering type.

It should be recalled that in some embodiments of the present technology, the rendering rules maintained within the rendering rule contained in the rendering rule 302 and/or the additional rendering rules 304 can prescribe different first number of the total number of POI labels indicating POI labels to be rendered using the first label rendering type for some or all of the zoom levels of the viewport. As such, in some embodiments of the present technology, where the second ranked set of search results is for displaying in the modified viewport having a different zoom level, the method 900 further comprises determining a zoom level for the modified viewport; and wherein the modifying the rendering rules to determine the modified rendering rule is further based on the zoom level.

If the map application 270 determines that the rendering rule for the zoom level does not prohibit POI labels of the first label rendering type, the map application 270 executes: keeping POI labels of both the first label rendering type and the second label rendering type still displayable within the modified viewport; in response to the given new POI having been determined to be rendered with the first label rendering type, rendering the given new POI with the first label rendering type.

On the other hand, the map application 270 determines that the rendering rule for the zoom level prohibits POI labels of the first label rendering type, the map application 270 executes: changing POI labels of the first label rendering type and the second label rendering type that are still potentially displayable within the modified viewport to the POI label of the second label rendering type; rendering all new POIs with the second label rendering type.

If the map application 270 determines that the rendering rule for the zoom level prohibits POI labels of the first label rendering type and prescribes a third label rendering type, the map application 270 executes: changing POI labels of the first label rendering type and the second label rendering type that are still potentially displayable within the modified viewport to the POI label of the third label rendering type; rendering all new POIs with the third label rendering type.

In accordance with embodiments of the present technology, the rendering of the POI labels is executed by selecting or pre-defining a form factor of the first label rendering type is selected to be visually more significant than a form factor of the second label rendering type.

As examples of the above, the form factor of the first label rendering type is larger than the form factor of the second label rendering type.

As another example, the first sub-set of POI includes the POI-identifier, the POI-description and the auxiliary-POI-data.

As another example, the first label rendering type is implemented in a form factor that includes: a graphical indication of the associated POI; a first text line including at least a portion of the POI-identifier; a second text line including at least a portion of the auxiliary-POI-data.

In some embodiments of the method 900, the method 900 further comprises, responsive to a user interaction with a given POI label, changing a visual appearance of the given POI label. For example, the POI label can be assigned a POI label state, depending on the history of the user interaction with the POI label. As an example, the label state can be one of: regular (the state before the user has interacted with the POI), selected (associated with the POI currently selected by the user) and visited (those POI that have been previously interacted with by the user). In some embodiments, the label states are distinguishable therebetween by color with which they are rendered on the map. In some embodiments of the present technology, the method 900 further comprises maintaining the changed visual appearance of the given POI label when additional POI labels are rendered.

Within the present description it should be understood that in all places where indicated the receiving data from any electronic device and/or from any email server and/or from any other server, the receiving of electronic or any other signal from suitable electronic device (server, email server) can be used, and the displaying on the device screen can be implemented as the transmission the signal to the display comprising certain information which further can be interpreted in a certain way and at least partially displayed on the screen of the electronic device. Transmitting and receiving of the signal are not mentioned everywhere within present description to simplify the description and for a better understanding of present solution. Signals can be transmitted by optical methods (for example, via fiber-optic connection), by electronic methods (via wired or wireless connection), by mechanical methods (transmitting of the pressure, temperature and/or other physical parameters by means of which the transmission of the signal is possible)

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for rendering search results on a map displayable on an electronic device, the search results being responsive to a geo-search query associated with the map, the electronic device connectable to a map server via a communication network, the method executable by the electronic device, the method comprising:
   receiving, from the server, a first ranked set of search results, each search result having:
      an indication of an associated geographical point of interest (POI) that is responsive to the geo-search query, the associated POI having a geo-position within a given viewport of the map displayable on the electronic device; and
      POI information of the associated POI, at least a portion of the POI information renderable on the electronic device as a POI label of the associated POI;
   determining a rendering rule associated with rendering POI labels on the electronic device, the rendering rule is for defining:
      a total number of POI labels to be displayed within the given viewport;
      a first number of the total number of POI labels indicating of POI labels to be rendered using a first label rendering type, the first label rendering type having a first subset of POI information, the first subset of POI information including at least a POI-identifier and a POI-description;
      a remainder of the total number of POI labels renderable using a second label rendering type, the second label rendering type having a second subset of POI information, the second subset of POI information containing a smaller amount of POI information than the first subset of POI information and the second label rendering type having decreased visual significance compared to the first label rendering type, the second subset of POI information including only the POI-identifier;
   for a given POI of the first ranked set of search results, determining based on the rendering rule a POI-label rendering instruction, the POI-label rendering instruction for causing the electronic device to render an associated POI label in one of the first label rendering type and the second label rendering type, the determining comprising:
   in response to the given POI being in the first number of top ranked search results of the first ranked set of search results, determining that the given POI should be rendered with the first label rendering type;
   in response to the given POI not being in the first number of top ranked search results first ranked set of search results, determining that the given POI should be rendered with the second label rendering type;
   based on the POI-label rendering instructions, rendering POI labels to be overlaid in the given viewport;
   receiving a second ranked set of search results for displaying in one of the given viewport and a modified viewport, the second ranked set of search results being at least partially different from the first set of ranked search results;
   calculating a label rendering type density parameter for the one of the given view port and the modified view port, the label rendering type density parameter being indicative of a number of POI labels of both the first label rendering type and the second label rendering type still displayed within the given viewport and the modified viewport;
   selecting from the second ranked plurality of search results, POIs that are not part of the number of POI labels of both the first label rendering type and the second label rendering type still displayed within the given viewport and the modified viewport, the selecting resulting in a set of new POIs;
   based on the label rendering type density parameter, modifying the rendering rule to determine a modified rendering rule, the modified rendering rule for defining a new first number of the total number of new POI labels to be rendered using the first label rendering type;

for a given new POI of the set of new POIs, determining a new POI-label rendering instruction by:
in response to a given new POI being in the new first number of top second ranked search results, determining that the given new POI should be rendered with the first label rendering type;
in response to the given new POI not being in the new first number of top second ranked search results, determining that the given new POI should be rendered with the second label rendering type;
based on the new POI-label rendering instructions, rendering new POI labels to be overlaid within the given viewport and the modified viewport.

2. The method of claim 1, wherein the POI information includes at least a POI-identifier, a POI-description and auxiliary-POI-data.

3. The method of claim 1, wherein the rendering new POI labels to be overlaid within the given viewport and the modified viewport comprises keeping POI labels of both the first label rendering type and the second label rendering type still displayed within the given viewport and the modified viewport.

4. The method of claim 1, wherein the rendering POI labels to be overlaid in the given viewport comprises rendering POI labels in an order of the search results in the first ranked set of search results.

5. The method of claim 4, wherein the rendering POI labels in the order of the search results in the first ranked set of search results comprises:
for each next POI label, checking for overlap with previously rendered POI labels; and
in response to detecting the overlap, modifying rendering instruction for the next POI label.

6. The method of claim 5, wherein modifying POI-rendering instruction comprises:
in response to the POI-rendering instruction being modified is for rendering the POI label using the first label rendering type, changing the first label rendering type to one of the second label rendering type and a third label rendering type;
the third label rendering type being one of: (i) having a third subset of POI information; the third sub-set of POI information being smaller than the second subset of POI information, and (ii) having a different graphical form-factor having a smaller footprint than a form-factor of the second label rendering type.

7. The method of claim 1, wherein the determining the rendering rule for defining comprises retrieving a pre-determined rendering rule.

8. The method of claim 7, wherein the first number of the total number of POI labels indicating POI labels to be rendered using the first label rendering type is pre-defined for each zoom level of the viewport.

9. The method of claim 8, wherein the second ranked set of search results for displaying in the modified viewport, the method further comprising:
determining a zoom level for the modified viewport; and wherein
the modifying the rendering rules to determine the modified rendering rule is further based on the zoom level.

10. The method of claim 9, wherein in response to the rendering rule for the zoom level not prohibiting POI labels of the first label rendering type, the method further comprises executing:
keeping POI labels of both the first label rendering type and the second label rendering type still displayable within the modified viewport;
in response to the given new POI having been determined to be rendered with the first label rendering type, rendering the given new POI with the first label rendering type.

11. The method of claim 10, wherein in response to the rendering rule for the zoom level prohibiting POI labels of the first label rendering type, the method further comprises executing:
changing POI labels of the first label rendering type and the second label rendering type that are still potentially displayable within the modified viewport to the POI label of the second label rendering type;
rendering all new POIs with the second label rendering type.

12. The method of claim 10, wherein in response to the rendering rule for the zoom level prohibiting POI labels of the first label rendering type and prescribing a third label rendering type, the method further comprises executing:
changing POI labels of the first label rendering type and the second label rendering type that are still potentially displayable within the modified viewport to the POI label of the third label rendering type;
rendering all new POIs with the third label rendering type.

13. The method of claim 1, wherein a form factor of the first label rendering type is selected to be visually more significant than a form factor of the second label rendering type.

14. The method of claim 2, wherein
the first sub-set of POI includes the POI-identifier, the POI-description and the auxiliary-POI-data.

15. The method of claim 14, wherein the first label rendering type is implemented in a form factor that includes:
a graphical indication of the associated POI;
a first text line including at least a portion of the POI-identifier;
a second text line including at least a portion of the auxiliary-POI-data.

16. The method of claim 1, wherein the receiving, from the server, the first ranked set of search results is executed in response to receiving the geo-search query.

17. The method of claim 16, wherein the receiving the geo-search query comprises one of: receiving the geo-search query from a user of the electronic device and generating the geo-search query in response to the user activating an application for displaying the map.

18. The method of claim 1, wherein the first sub-set of POI information is at least partially different from the second subset of POI information.

19. An electronic device comprising:
a processor,
a memory accessible by the processor,
a network module accessible by the processor,
the memory storing computer executable instructions, which instructions when executed cause the processor to execute:
receiving, from the server, a first ranked set of search results, each search result having:
an indication of an associated geographical point of interest (POI) that is responsive to the geo-search query, the associated POI having a geo-position within a given viewport of the map displayable on the electronic device; and
POI information of the associated POI, at least a portion of the POI information renderable on the electronic device as a POI label of the associated POI;

determining a rendering rule associated with rendering POI labels on the electronic device, the rendering rule is for defining:
a total number of POI labels to be displayed within the given viewport;
a first number of the total number of POI labels indicating of POI labels to be rendered using a first label rendering type, the first label rendering type having a first subset of POI information, the first subset of POI information including at least a POI-identifier and a POI-description;
a remainder of the total number of POI labels renderable using a second label rendering type, the second label rendering type having a second subset of POI information, the second subset of POI information containing a smaller amount of POI information than the first subset of POI information and the second label rendering type having decreased visual significance compared to the first label rendering type, the second subset of POI information including only the POI-identifier;
for a given POI of the first ranked set of search results, determining based on the rendering rule a POI-label rendering instruction, the POI-label rendering instruction for causing the electronic device to render an associated POI label in one of the first label rendering type and the second label rendering type, the determining comprising:
in response to the given POI being in the first number of top ranked search results of the first ranked set of search results, determining that the given POI should be rendered with the first label rendering type;
in response to the given POI not being in the first number of top ranked search results first ranked set of search results, determining that the given POI should be rendered with the second label rendering type;
based on the POI-label rendering instructions, rendering POI labels to be overlaid in the given viewport;
receiving a second ranked set of search results for displaying in one of the given viewport and a modified viewport, the second ranked set of search results being at least partially different from the first set of ranked search results;
calculating a label rendering type density parameter for the one of the given view port and the modified view port, the label rendering type density parameter being indicative of a number of POI labels of both the first label rendering type and the second label rendering type still displayed within the given viewport and the modified viewport;
selecting from the second ranked plurality of search results, POIs that are not part of the number of POI labels of both the first label rendering type and the second label rendering type still displayed within the given viewport and the modified viewport, the selecting resulting in a set of new POIs;
based on the label rendering type density parameter, modifying the rendering rule to determine a modified rendering rule, the modified rendering rule for defining a new first number of the total number of new POI labels to be rendered using the first label rendering type;
for a given new POI of the set of new POIs, determining a new POI-label rendering instruction by:

in response to a given new POI being in the new first number of top second ranked search results, determining that the given new POI should be rendered with the first label rendering type;
in response to the given new POI not being in the new first number of top second ranked search results, determining that the given new POI should be rendered with the second label rendering type;
based on the new POI-label rendering instructions, rendering new POI labels to be overlaid within the given viewport and the modified viewport.

20. A method for rendering search results on a map displayable on an electronic device, the search results being responsive to a geo-search query associated with the map, the electronic device connectable to a map server via a communication network, the method executable by the electronic device, the method comprising:
receiving, from the server, a first ranked set of search results, each search result having:
an indication of an associated geographical point of interest (POI) that is responsive to the geo-search query, the associated POI having a geo-position within a given viewport of the map displayable on the electronic device; and
POI information of the associated POI, at least a portion of the POI information renderable on the electronic device as a POI label of the associated POI;
determining a rendering rule associated with rendering POI labels on the electronic device, the rendering rule is for defining:
a total number of POI labels to be displayed within the given viewport;
a first number of the total number of POI labels indicating of POI labels to be rendered using a first label rendering type, the first label rendering type having a first subset of POI information;
a remainder of the total number of POI labels renderable using a second label rendering type, the second label rendering type having a second subset of POI information, the second subset of POI information containing a smaller amount of POI information than the first subset of POI information and the second label rendering type having decreased visual significance compared to the first label rendering type;
for a given POI of the first ranked set of search results, determining based on the rendering rule a POI-label rendering instruction, the POI-label rendering instruction for causing the electronic device to render an associated POI label in one of the first label rendering type and the second label rendering type, the determining comprising:
in response to the given POI being in the first number of top ranked search results of the first ranked set of search results, determining that the given POI should be rendered with the first label rendering type;
in response to the given POI not being in the first number of top ranked search results first ranked set of search results, determining that the given POI should be rendered with the second label rendering type;
based on the POI-label rendering instructions, rendering POI labels to be overlaid in the given viewport, which comprises rendering POI labels in an order of the search results in the first ranked set of search results, the rendering POI labels in the order of the search results in the first ranked set of search results comprising:

for each next POI label, checking for overlap with previously rendered POI labels; and in response to detecting the overlap, modifying rendering instruction for the next POI label, the modifying POI-rendering instruction comprising:

in response to the POI-rendering instruction being modified is for rendering the POI label using the first label rendering type, changing the first label rendering type to one of the second label rendering type and a third label rendering type;

the third label rendering type being one of: (i) having a third subset of POI information; the third sub-set of POI information being smaller than the second subset of POI information, and (ii) having a different graphical form-factor having a smaller footprint than a form-factor of the second label rendering type;

receiving a second ranked set of search results for displaying in one of the given viewport and a modified viewport, the second ranked set of search results being at least partially different from the first set of ranked search results;

calculating a label rendering type density parameter for the one of the given view port and the modified view port, the label rendering type density parameter being indicative of a number of POI labels of both the first label rendering type and the second label rendering type still displayed within the given viewport and the modified viewport;

selecting from the second ranked plurality of search results, POIs that are not part of the number of POI labels of both the first label rendering type and the second label rendering type still displayed within the given viewport and the modified viewport, the selecting resulting in a set of new POIs;

based on the label rendering type density parameter, modifying the rendering rule to determine a modified rendering rule, the modified rendering rule for defining a new first number of the total number of new POI labels to be rendered using the first label rendering type;

for a given new POI of the set of new POIs, determining a new POI-label rendering instruction by:

in response to a given new POI being in the new first number of top second ranked search results, determining that the given new POI should be rendered with the first label rendering type;

in response to the given new POI not being in the new first number of top second ranked search results, determining that the given new POI should be rendered with the second label rendering type;

based on the new POI-label rendering instructions, rendering new POI labels to be overlaid within the given viewport and the modified viewport.

* * * * *